(12) United States Patent
Tomii et al.

(10) Patent No.: US 11,466,570 B2
(45) Date of Patent: Oct. 11, 2022

(54) ROTOR ASSEMBLY AND ROTATING MACHINE

(71) Applicant: MITSUBISHI HEAVY INDUSTRIES AERO ENGINES, LTD., Komaki (JP)

(72) Inventors: Masayuki Tomii, Tokyo (JP); Kentaro Akimoto, Aichi (JP)

(73) Assignee: MITSUBISHI HEAVY INDUSTRIES AERO ENGINES, LTD., Aichi (JP)

( * ) Notice: Subject to any disclaimer, the term of this patent is extended or adjusted under 35 U.S.C. 154(b) by 15 days.

(21) Appl. No.: 17/278,493

(22) PCT Filed: Jul. 17, 2019

(86) PCT No.: PCT/JP2019/028167
§ 371 (c)(1),
(2) Date: Mar. 22, 2021

(87) PCT Pub. No.: WO2020/066235
PCT Pub. Date: Apr. 2, 2020

(65) Prior Publication Data
US 2022/0112810 A1 Apr. 14, 2022

(30) Foreign Application Priority Data

Sep. 26, 2018 (JP) .............................. JP2018-180172

(51) Int. Cl.
*F01D 5/10* (2006.01)
*F01D 5/02* (2006.01)

(52) U.S. Cl.
CPC ............. *F01D 5/021* (2013.01); *F01D 5/10* (2013.01); *F05D 2250/231* (2013.01); *F05D 2250/241* (2013.01); *F05D 2250/71* (2013.01)

(58) Field of Classification Search
CPC . F01D 5/10; F01D 5/26; F01D 11/006; F04D 29/688; F05D 2250/231;
(Continued)

(56) References Cited

U.S. PATENT DOCUMENTS 2,651,494 A * 9/1953 Persson .................... F01D 5/26
29/889.21
3,266,771 A 8/1966 Morley
(Continued)

FOREIGN PATENT DOCUMENTS

JP 09303107 A * 11/1997 ............... F01D 5/22
JP 2006125372 A 5/2006
(Continued)

OTHER PUBLICATIONS

International Search Report for International Application No. PCT/JP2019/028167 dated Sep. 10, 2019; 11pp.
(Continued)

*Primary Examiner* — Christopher R Legendre
(74) *Attorney, Agent, or Firm* — Kanesaka Berner and Partners LLP

(57) ABSTRACT

A rotor assembly includes: a rotor disc; a plurality of rotor blades fixed to the rotor disc and extending radially outward in a radial direction of the rotor disc; and at least one rolling element configured to roll on a curved surface facing inward in the radial direction of the rotor disc.

15 Claims, 11 Drawing Sheets

(58) Field of Classification Search
CPC ......... F05D 2250/241; F05D 2250/311; F05D 2250/312; F05D 2250/71
See application file for complete search history.

(56) References Cited

U.S. PATENT DOCUMENTS

| | | | |
|---|---|---|---|
| 5,143,517 A * | 9/1992 | Vermont | F01D 5/22 |
| | | | 416/193 A |
| 8,137,071 B2 | 3/2012 | Caucheteux et al. | |
| 9,194,238 B2 * | 11/2015 | Roberts, III | F01D 11/008 |
| 2008/0206043 A1 | 8/2008 | Richter | |
| 2014/0147276 A1 | 5/2014 | Roberts, III et al. | |
| 2022/0112810 A1* | 4/2022 | Tomii | F04D 29/324 |

FOREIGN PATENT DOCUMENTS

| | | | |
|---|---|---|---|
| JP | 2008045747 A | 2/2008 |
| JP | 2008303794 A | 12/2008 |
| JP | 5362252 B2 | 12/2013 |
| JP | S5451202 B2 | 3/2014 |
| JP | 2014105705 A | 6/2014 |
| JP | 2014185646 A | 10/2014 |

OTHER PUBLICATIONS

International Preliminary Report on Patentability for International Application No. PCT/JP2019/028167 dated Apr. 8, 2021; 18 pp.

* cited by examiner

ROTOR ASSEMBLY AND ROTATING MACHINE

RELATED APPLICATIONS

The present application is a National Phase of International Application Number PCT/JP2019/028167 filed Jul. 17, 2019 and claims priority to Japanese Application Number 2018-180172 filed Sep. 26, 2018.

TECHNICAL FIELD

The present disclosure relates to a rotor assembly and a rotating machine.

BACKGROUND

Patent Document 1 discloses a rotor blade body (rotor assembly). This rotor assembly includes a rotor disc rotatable with a main shaft, a plurality of rotor blades mounted so as to radially extend from the outer peripheral portion of the rotor disc, a damper member mounted in a gap between platforms of the circumferentially adjacent rotor blades, and an adjustment member interposed between the platform and the damper member so as to be able to adjust the contact angle with respect to the damper member. One of the opposing surfaces of the circumferentially adjacent platforms is parallel to the radial direction of the rotor disc, and the other of the opposing surfaces of the platforms is inclined with respect to the radial direction of the rotor disc so as to expand toward the center of the main shaft.

Such a rotor assembly has an adjustment member interposed between the platform and the damper member to adjust the contact angle with respect to the damper member. By adjusting the contact angle, the reaction force input from the platform to the damper member via the adjustment member is increased or decreased during the rotation of the rotor assembly. Thus, the optimum contact angle can be selected according to the shape and rotational speed of the rotor assembly, and the vibration occurring in the rotor blade can be appropriately reduced.

CITATION LIST

Patent Literature

Patent Document 1: JP2014-185646A

SUMMARY

Problems to be Solved

In order to improve the flexibility and reliability of the rotor assembly design, it is required to further reduce the vibration occurring in the rotor blade. However, in the rotor assembly disclosed in Patent Document 1, it may be difficult to reduce the vibration of the rotor blade at the natural frequency corresponding to the rotational speed of the rotor assembly.

In view of the above, an object of at least one embodiment of the present invention is to provide a rotor assembly and a rotating machine that can reduce the vibration of the rotor blade at the natural frequency corresponding to the rotational speed of the rotor assembly.

Solution to the Problems (1) A rotor assembly according to at least one embodiment of the present invention comprises: a rotor disc; a plurality of rotor blades fixed to the rotor disc and extending radially outward in a radial direction of the rotor disc; and at least one rolling element configured to roll on a curved surface facing inward in the radial direction of the rotor disc.

With the above configuration (1), as the rotor assembly rotates, the centrifugal force acts on the rolling element. Due to the action of the centrifugal force, the rolling element is pressed against the curved surface facing inward in the radial direction of the rotor disc, and when the rotor blade vibrates, the rolling element rolls on the curved surface. Since the rolling frequency fn of the rolling element is proportional to the rotational speed $\Omega$ of the rotor assembly (fn=C×$\Omega$), when the constant C is set to an integer-multiple order of excitation harmonic, the vibration of the rotor blade is damped on the excitation harmonic. As a result, the rotor assembly can reduce the vibration of the rotor blade at the natural frequency corresponding to the rotational speed of the rotor assembly.

(2) In some embodiments, in the above configuration (1), the at least one rolling element has a circular outer shape in a cross-section perpendicular to a direction along a central axis of the rotor disc.

With the above configuration (2), since the rolling element smoothly rolls on the curved surface facing inward in the radial direction of the rotor disc, the rotor assembly can smoothly reduce the vibration of the rotor blade at the natural frequency corresponding to the rotational speed of the rotor disc.

(3) In some embodiments, in the above configuration (2), the curved surface has a constant curvature radius R, and the at least one rolling element has a radius r smaller than the curvature radius R.

With the above configuration (3), the rolling frequency fn of the rolling element is expressed by the following expression 1:

$$fn = \frac{1}{2\pi}\sqrt{\frac{2}{3}\frac{d}{(R-r)}}\,\Omega \qquad \text{(Expression 1)}$$

wherein d is a distance of the rolling element from the central axis of the rotor disc.

Accordingly, when the constant C expressed by the following expression 2 is set to an integer-multiple order of excitation harmonic, the vibration of the rotor blade is damped on the excitation harmonic.

$$C = \frac{1}{2\pi}\sqrt{\frac{2}{3}\frac{d}{(R-r)}} \qquad \text{(Expression 2)}$$

As a result, the rotor assembly can reduce the vibration of the rotor blade at the natural frequency corresponding to the rotational speed of the rotor assembly.

(4) In some embodiments, in the above configuration (3), the at least one rolling element includes: a first rolling element configured to roll on a first curved surface as the curved surface; and a second rolling element configured to roll on a second curved surface as the curved surface. The rotor assembly satisfies at least one of the following conditions (A) to (C):

(A) a first curvature radius R1 of the first curved surface is different from a second curvature radius R2 of the second curved surface;

(B) a first radius r1 of the first rolling element is different from a second radius r2 of the second rolling element; or (C) a distance d1 from a central axis of the rotor disc to the first rolling element is different from a distance d2 from the central axis of the rotor disc to the second rolling element.

With the above configuration (4), the integer-multiple orders of excitation harmonics of the first rolling element and the second rolling element are made different, so that the vibration of the rotor blade is damped on the excitation harmonics of different integer-multiple orders. As a result, the rotor assembly can reduce the vibration of the rotor blade at the natural frequency corresponding to the rotational speed of the rotor assembly on the excitation harmonics of different integer-multiple orders.

(5) In some embodiments, in the above configuration (4), the first rolling element and the second rolling element are disposed at different positions in a direction along the central axis of the rotor disc.

With the above configuration (5), in the direction along the central axis of the rotor disc, the integer-multiple orders of excitation harmonics of the first rolling element and the second rolling element are made different, so that the vibration of the rotor blade is damped on the excitation harmonics of different integer-multiple orders. As a result, the rotor assembly can reduce the vibration of the rotor blade at the natural frequency corresponding to the rotational speed of the rotor assembly on the excitation harmonics of different integer-multiple orders.

(6) In some embodiments, in any one of the above configurations (1) to (5), the at least one rolling element is a tubular member or a cylindrical member.

With the above configuration (6), as the rotor assembly rotates, the centrifugal force acts on the tubular member or the cylindrical member (rolling element). Due to the action of the centrifugal force, the tubular member or the cylindrical member is pressed against the curved surface facing inward in the radial direction of the rotor disc, and when the rotor blade vibrates, the tubular member or the cylindrical member rolls on the curved surface.

(7) In some embodiments, in any one of the above configurations (1) to (5), the at least one rolling element is a plurality of spherical members.

With the above configuration (7), as the rotor assembly rotates, the centrifugal force acts on the spherical members (rolling elements). Due to the action of the centrifugal force, the spherical members are pressed against the curved surface facing inward in the radial direction of the rotor disc, and when the rotor blade vibrates, the spherical members roll on the curved surface and collide with each other. The collision of the spherical members further reduces the vibration of the rotor blade.

(8) In some embodiments, in any one of the above configurations (1) to (7), the curved surface is provided on a U-shaped plate spring disposed between two of the plurality of rotor blades which are adjacent in a circumferential direction of the rotor disc. The U-shape plate spring has a U-shaped opening facing inward in the radial direction of the rotor disc.

With the above configuration (8), the frictional force acts between the U-shaped plate spring and the rotor blade to damp the vibration occurring in the rotor blade. As a result, the rotor assembly can reduce the vibration of the rotor blade.

(9) In some embodiments, in the above configuration (5), the rotor assembly comprises: a first U-shaped plate spring having a first curved surface as the curved surface; and a second U-shaped plate spring having a second curved surface as the curved surface. The first U-shaped plate spring and the second U-shaped plate spring are disposed at different positions in a direction along the central axis of the rotor disc.

With the above configuration (9), in the direction along the central axis of the rotor disc, the integer-multiple orders of excitation harmonics of, on one hand, the first rolling element and the first U-shaped plate spring, and on the other hand, the second rolling element and the second U-shaped plate spring are made different, so that the vibration of the rotor blade is damped on the excitation harmonics of different integer-multiple orders. As a result, the rotor assembly can reduce the vibration of the rotor blade at the natural frequency corresponding to the rotational speed of the rotor assembly on the excitation harmonics of different integer-multiple orders.

(10) A rotating machine according to some embodiments of the present invention comprises: the rotor assembly described in any one of the above (1) to (9).

With the above configuration (10), in the rotating machine, as the rotor assembly rotates, the centrifugal force acts on the rolling element. Due to the action of the centrifugal force, the rolling element is pressed against the curved surface facing inward in the radial direction of the rotor disc, and when the rotor blade vibrates, the rolling element rolls on the curved surface. Since the rolling frequency fn of the rolling element is proportional to the rotational speed $\Omega$ of the rotor assembly (fn=C×$\Omega$), when the constant C is set to an integer-multiple order of excitation harmonic, the vibration of the rotor blade is damped on the excitation harmonic. As a result, the rotating machine can reduce the vibration of the rotor blade at the natural frequency corresponding to the rotational speed of the rotor assembly.

Advantageous Effects

According to at least one embodiment of the present invention, the rotor assembly and the rotating machine can reduce the vibration of the rotor blade at the natural frequency corresponding to the rotational speed of the rotor assembly.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 8A:
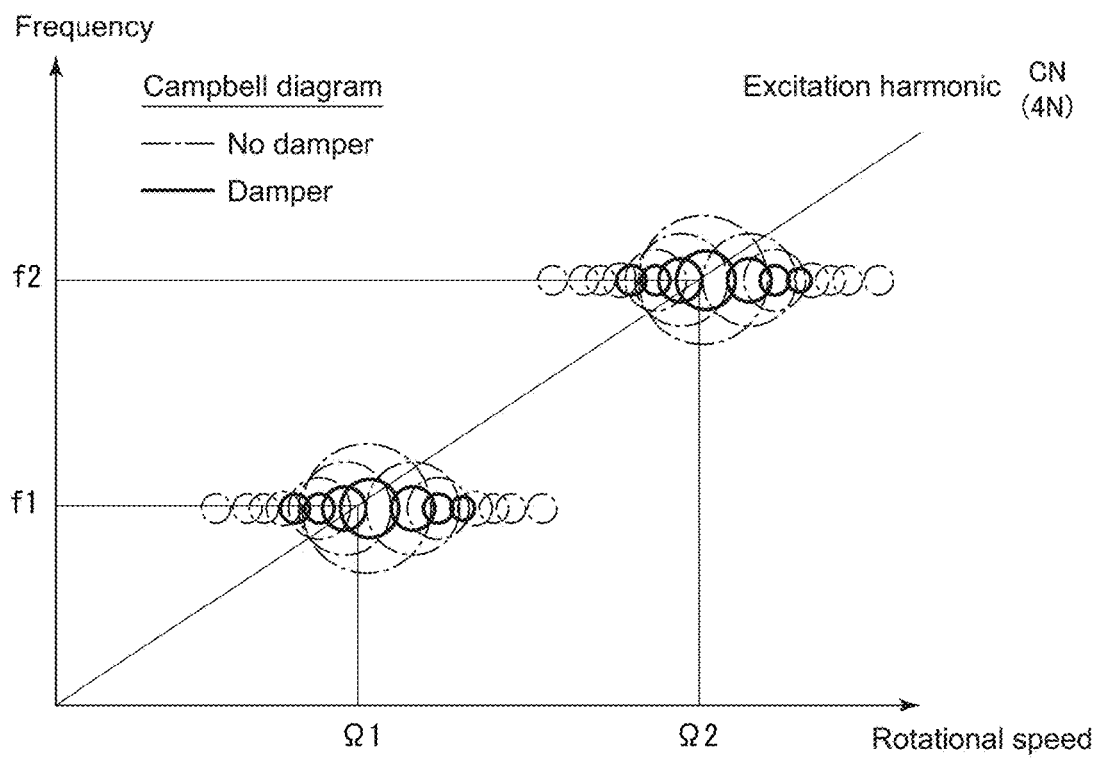
FIG. 8A is a Campbell diagram of the rotor assembly shown in FIG. 2.
Figure 8B:
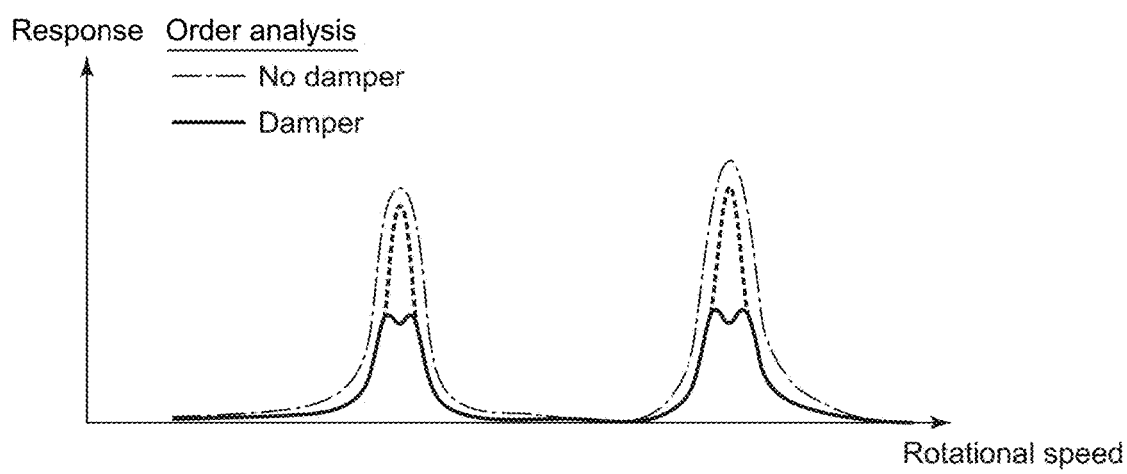
FIG. 8B is an order analysis diagram of the rotor assembly shown in FIG. 2.
Figure 9:
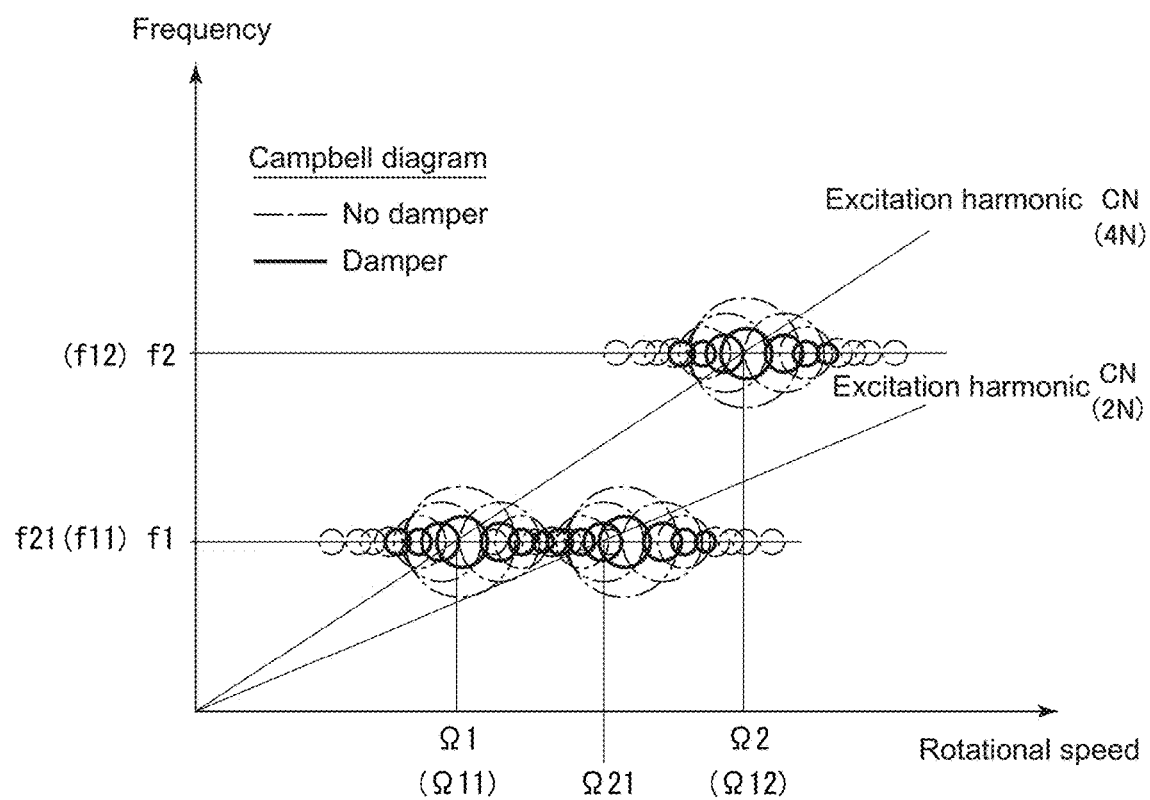
FIG. 9 is a Campbell diagram of the rotor assembly shown in FIG. 4.

FIGS. 1 to 7 are schematic front views of a main portion of a rotor assembly 1A, 1B, 1C, 1D, 1E, 1F, 1G according to an embodiment of the present invention. FIG. 8A is a Campbell diagram of the rotor assembly 1B shown in FIG. 2. FIG. 8B is an order analysis diagram of the rotor assembly 1B shown in FIG. 2. FIG. 9 is a Campbell diagram of the rotor assembly 1C shown in FIG. 4. FIG. 10 are diagrams showing the U-shaped plate spring 5 and the rolling element 4B, 4C, 4D, 4E, 4F, 4G shown in FIGS. 2 to 7. FIG. 11 is a schematic diagram of a rotating machine according to an embodiment of the present invention.

The rotor assembly 1A, 1B, 1C, 1D, 1E, 1F, 1G according to some embodiments of the present invention is provided on a rotating machine, for example. The rotating machine is, for example, an axial flow rotating machinery in which a fluid flows in a direction along a rotational shaft 101 (see FIG. 11), such as a gas turbine (see FIG. 11), a steam turbine, or a jet engine.

As shown in FIGS. 1 to 7, the rotor assembly 1A, 1B, 1C, 1D, 1E, 1F, 1G according to some embodiments of the present invention includes a rotor disc 2, a plurality of rotor blades 3, and at least one rolling element 4A, 4B, 4C, 4D, 4E, 4F, 4G.

The rotor disc 2 is supported rotatably around the central axis O of the rotor assembly 1A, 1B, 1C, 1D, 1E, 1F, 1G. The rotor blades 3 are fixed to the rotor disc 2 and extend radially outward in a direction away from the central axis O (hereinafter, referred to as "radial direction") in a plane perpendicular to the central axis O of the rotor disc 2. The at least one rolling element 4A, 4B, 4C, 4D, 4E, 4F, 4G is configured to roll on a curved surface CS facing inward in the radial direction of the rotor disc 2.

With the rotor assembly 1A, 1B, 1C, 1D, 1E, 1F, 1G according to the above-described embodiments of the present invention, as the rotor assembly 1A, 1B, 1C, 1D, 1E, 1F, 1G rotates, the centrifugal force F acts on the rolling element 4A, 4B, 4C, 4D, 4E, 4F, 4G. Due to the action of the centrifugal force F, the rolling element 4A, 4B, 4C, 4D, 4E, 4F, 4G is pressed against the curved surface CS facing inward in the radial direction of the rotor disc 2, and when the rotor blade 3 vibrates, the rolling element 4A, 4B, 4C, 4D, 4E, 4F, 4G rolls on the curved surface CS. Since the rolling frequency fn of the rolling element 4A, 4B, 4C, 4D, 4E, 4F, 4G is proportional to the rotational speed $\Omega$ of the rotor assembly 1A, 1B, 1C, 1D, 1E, 1F, 1G (fn=C×$\Omega$), when the constant C is set to an integer-multiple order of excitation harmonic, the vibration of the rotor blade 3 is damped on the excitation harmonic (see FIGS. 8A and 9). As a result, the rotor assembly 1A, 1B, 1C, 1D, 1E, 1F, 1G can reduce the vibration of the rotor blade 3 at the natural frequency corresponding to the rotational speed of the rotor assembly 1A, 1B, 1C, 1D, 1E, 1F, 1G.

For example, as shown in FIGS. 8A and 9, in order to deal with 4N excitation harmonic, the constant C of fn=C×$\Omega$ may be set to 4. In this case, when the rotational speed of the rotor assembly 1A, 1B, 1C, 1D, 1E, 1F, 1G is $\Omega1$, the 4N excitation harmonic intersects the natural frequency f1 of the first mode, and when the rotational speed of the rotor assembly 1A, 1B, 1C, 1D, 1E, 1F, 1G is $\Omega2$, the 4N excitation harmonic intersects the natural frequency f2 of the second mode. Thus, when fn=4×$\Omega$, fn=f1 at $\Omega1$ and fn=f2 at $\Omega2$, so that the vibration of the rotor blade 3 at the natural frequency corresponding to each rotational speed can be reduced.

As shown in FIGS. 1 to 7, in the rotor assembly 1A, 1B, 1C, 1D, 1E, 1F, 1G according to some embodiments of the present invention, the rolling element 4A, 4B, 4C, 4D, 4E, 4F, 4G has a circular outer shape in a cross-section perpendicular to the direction along the central axis O of the rotor disc 2. The rolling element 4A, 4B, 4C, 4D, 4E, 4F, 4G having a circular outer shape in a cross-section perpendicular to the direction along the central axis O of the rotor disc 2 is, for example, a tubular member of tubular shape, a cylindrical member of cylindrical shape, or a spherical member of spherical shape. The tubular member and the cylindrical member are arranged such that their central axis is oriented along the central axis O of the rotor disc 2, for example.

With the rotor assembly 1A, B, 1C, 1D, 1E, 1F, 1G according to the above-described embodiments of the present invention, since the rolling element 4A, 4B, 4C, 4D, 4E, 4F, 4G smoothly rolls on the curved surface CS facing inward in the radial direction of the rotor disc 2, the rotor assembly 1A, 1B, 1C, 1D, 1E, 1F, 1G can smoothly reduce the vibration of the rotor blade 3 at the natural frequency corresponding to the rotational speed of the rotor disc 2.

As shown in FIGS. 1 to 7, in the rotor assembly 1A, 1B, 1C, 1D, 1E, 1F, 1G according to some embodiments of the present invention, the curved surface CS has a constant curvature radius R, and the rolling element 4A, 4B, 4C, 4D, 4E, 4F, 4G has a radius r smaller than the curvature radius R.

With the rotor assembly 1A, 1B, 1C, 1D, 1E, 1F, 1G according to the above-described embodiments of the present invention, the rolling frequency fn of the rolling element 4A, 4B, 4C, 4D, 4E, 4F, 4G is expressed by the following expression 3.

$$fn = \frac{1}{2\pi}\sqrt{\frac{2}{3}\frac{d}{(R-r)}}\Omega \qquad \text{(Expression 3)}$$

wherein d is a distance of the rolling element 4A, 4B, 4C, 4D, 4E, 4F, 4G from the central axis O of the rotor disc 2.

Accordingly, when the constant C expressed by the following expression 4 is set to an integer-multiple order of excitation harmonic, the vibration of the rotor blade 3 is damped on the excitation harmonic (sees FIGS. 8A and 9).

$$C = \frac{1}{2\pi}\sqrt{\frac{2}{3}\frac{d}{(R-r)}} \qquad \text{(Expression 4)}$$

As a result, the rotor assembly 1A, 1B, 1C, 1D, 1E, 1F, 1G can reduce the vibration of the rotor blade 3 at the natural frequency corresponding to the rotational speed of the rotor assembly 1A, 1B, 1C, 1D, 1E, 1F, 1G.

As shown in FIGS. 1 to 7, in the rotor assembly 1A, 1B, 1C, 1D, 1E, 1F, 1G according to some embodiments of the present invention, side surfaces SD extending along the radial direction of the rotor disc 2 are provided on both sides of the curved surface CS having a constant curvature radius.

With the rotor assembly 1A, 1B, 1C, 1D, 1E, 1F, 1G according to the above-described embodiments of the present invention, as the rotor assembly 1A, 1B, 1C, 1D, 1E, 1F, 1G rotates, the centrifugal force F acts on the rolling element 4A, 4B, 4C, 4D, 4E, 4F, 4G. Due to the action of the centrifugal force F, the rolling element 4A, 4B, 4C, 4D, 4E, 4F, 4G is pressed against the curved surface CS positioned between the side surfaces SD, and when the rotor blade 3 vibrates, the rolling element 4A, 4B, 4C, 4D, 4E, 4F, 4G rolls on the curved surface CS. In other words, the rolling range of the rolling element 4A, 4B, 4C, 4D, 4E, 4F, 4G is defined by the pair of side surfaces SD.

As shown in FIGS. 3 to 6, in the rotor assembly 1C, 1D, 1E, 1F according to some embodiments of the present invention, the at least one rolling element 4C, 4D, 4E, 4F includes a first rolling element 41C, 41D, 41E, 41F and a second rolling element 42C, 42D, 42E, 42F. The first rolling element 41C, 41D, 41E, 41F is configured to roll on a first curved surface CS1 as the curved surface CS, and the second rolling element 42C, 42D, 42E, 42F is configured to roll on a second curved surface CS2 as the curved surface CS.

In this case, the first curved surface CS1, the second curved surface CS2, the first rolling element 41C, 41D, 41E, 41F, and the second rolling element 42C, 42D, 42E, 42F satisfy at least one of the following conditions (A) to (C):

(A) the first curvature radius R1 of the first curved surface CS1 is different from the second curvature radius R2 of the second curved surface CS2;

(B) the first radius r1 of the first rolling element 41D, 41F is different from the second radius r2 of the second rolling element 42D, 42F; or (C) the distance d1 from the central axis O of the rotor disc 2 to the first rolling element 41D, 41E, 41F is different from the distance d2 from the central axis O of the rotor disc 2 to the second rolling element 42D, 42E, 42F.

As shown in FIG. 9, with the rotor assembly 1C, 1D, 1E, 1F according to the above-described embodiments of the present invention, the integer-multiple orders of the first rolling element 41C, 41D, 41E, 41F and the second rolling element 42C, 42D, 42E, 42F are made different, so that the vibration of the rotor blade 3 is damped on the excitation harmonics of different integer-multiple orders. As a result, the rotor assembly 1C, 1D, 1E, 1F can reduce the vibration of the rotor blade 3 at the natural frequency corresponding to the rotational speed of the rotor assembly 1C, 1D, 1E, 1F on the excitation harmonics of different integer-multiple orders.

Figure 3A:
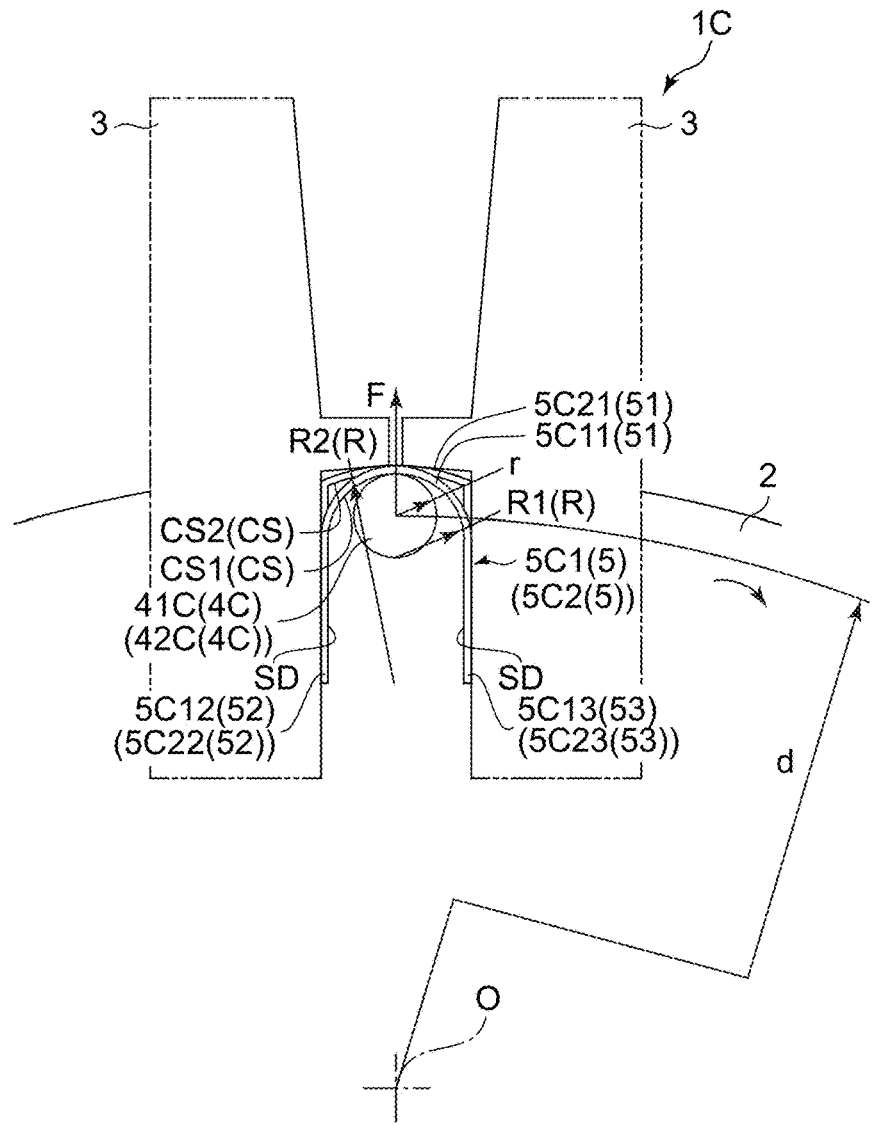
FIG. 3A is a schematic front view of a main portion of a rotor assembly according to an embodiment of the present invention.
Figure 3B:
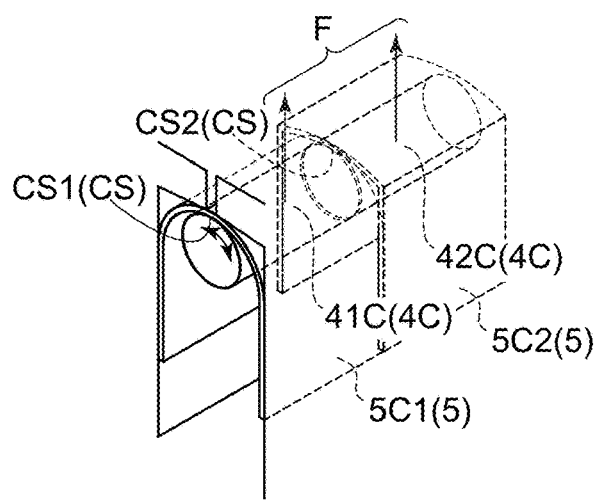
FIG. 3B is a perspective view of a rolling element which rolls on the curved surface shown in FIG. 3A.

For example, as shown in FIG. 3, the first curvature radius R1 of the first curved surface CS1 may be different from the second curvature radius R2 of the second curved surface CS2.

For example, the first curvature radius R1 of the first curved surface CS1 is set such that the constant C1 in the expression $fn1=C1\times\Omega$ representing the rolling frequency of the first rolling element 41C is 4, and the second curvature radius R2 of the second curved surface CS2 is set such that the constant C2 in the expression $fn2=C2\times\Omega$ representing the rolling frequency of the second rolling element 42C is 2. In this case, when the rotational speed of the rotor assembly 1C is $\Omega11$, the 4N excitation harmonic intersects the natural frequency f11 of the first mode, and when the rotational speed of the rotor assembly 1C is $\Omega12$, the 4N excitation harmonic intersects the natural frequency f12 of the second mode. In addition, when the rotational speed of the rotor assembly 1C is $\Omega21$, the 2N excitation harmonic intersects the natural frequency f21 (f11) of the first mode.

Thus, when the first curvature radius R1 of the first curved surface CS1 is set such that the constant C1 is 4 while the second curvature radius R2 of the second curved surface CS2 is set such that the constant C2 is 2, fn=f11 at $\Omega11$, fn=f12 at $\Omega12$, and fn=f21 at $\Omega21$, so that the vibration of the rotor blade 3 at the natural frequency corresponding to each rotational speed can be reduced.

Figure 4A:
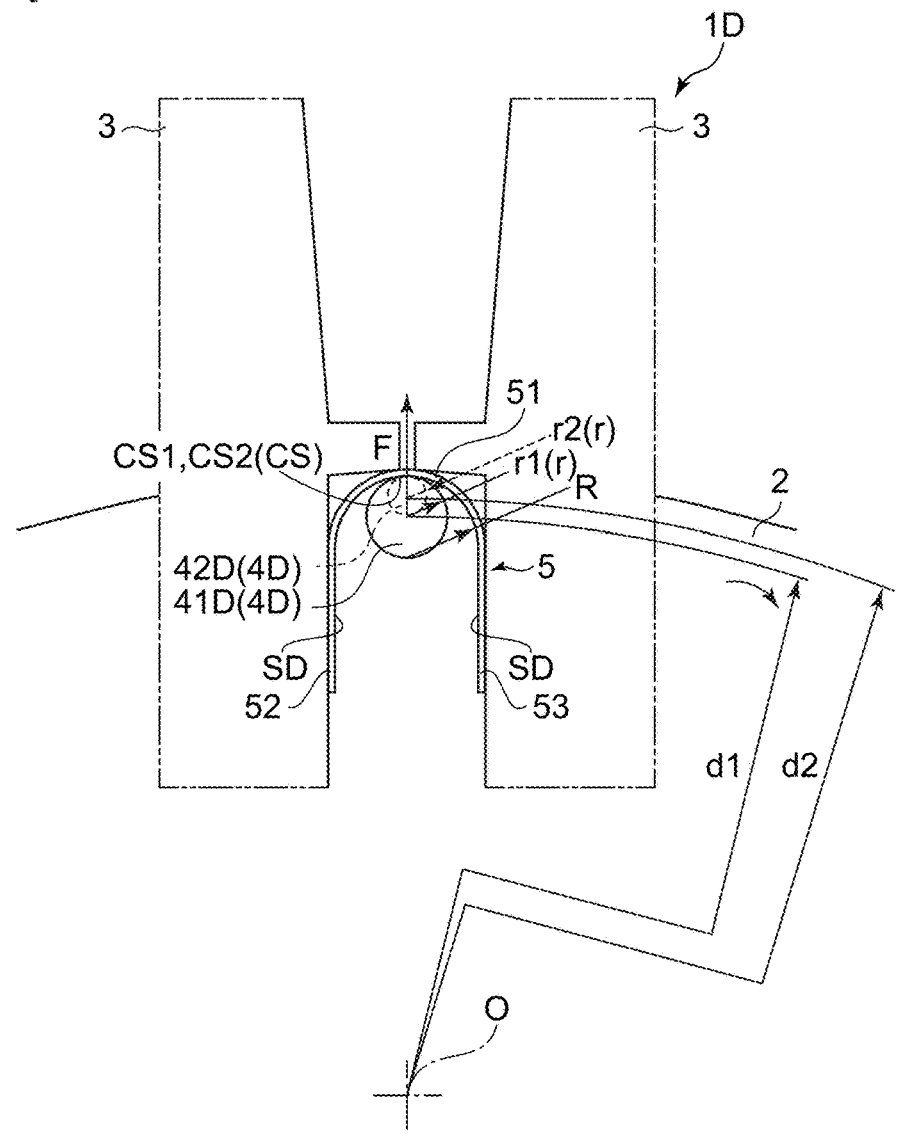
FIG. 4A is a schematic front view of a main portion of a rotor assembly according to an embodiment of the present invention.
Figure 4B:
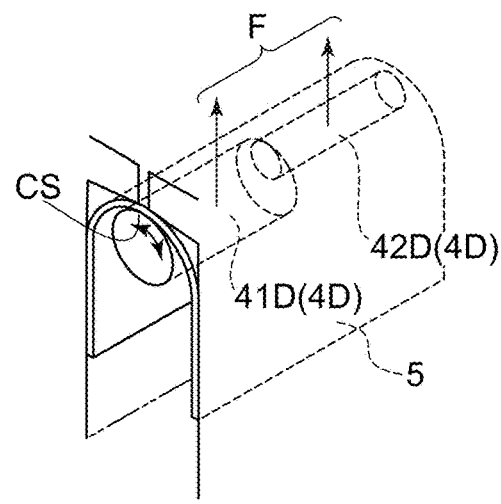
FIG. 4B is a perspective view of a rolling element which rolls on the curved surface shown in FIG. 4A.

For example, in the rotor assembly 1D shown in FIG. 4, the first radius r1 of the first rolling element 41D is different from the second radius r2 of the second rolling element 42D.

For example, the first radius r1 of the first rolling element 41D is set such that the constant C1 in the expression $fn1=C1\times\Omega$ representing the rolling frequency of the first rolling element 41D is 4, and the second radius r2 of the second rolling element 42D is set such that the constant C2 in the expression $fn2=C2\times\Omega$ representing the rolling frequency of the second rolling element 42D is 2. In this case, as shown in FIG. 9, when the rotational speed of the rotor assembly 1D is $\Omega11$, the 4N excitation harmonic intersects the natural frequency f11 of the first mode, and when the rotational speed of the rotor assembly 1D is $\Omega12$, the 4N excitation harmonic intersects the natural frequency f12 of the second mode. In addition, when the rotational speed of the rotor assembly 1D is Ω21, the 2N excitation harmonic intersects the natural frequency f21 (f11) of the first mode.

Thus, when the first radius r1 of the first rolling element 41D is set such that the constant C1 is 4 while the second radius r2 of the second rolling element 42D is set such that the constant C2 is 2, fn=f11 at Ω11, fn=f12 at Ω12, and fn=f21 at Ω21, so that the vibration of the rotor blade 3 at the natural frequency corresponding to each rotational speed can be reduced.

Figure 5A:
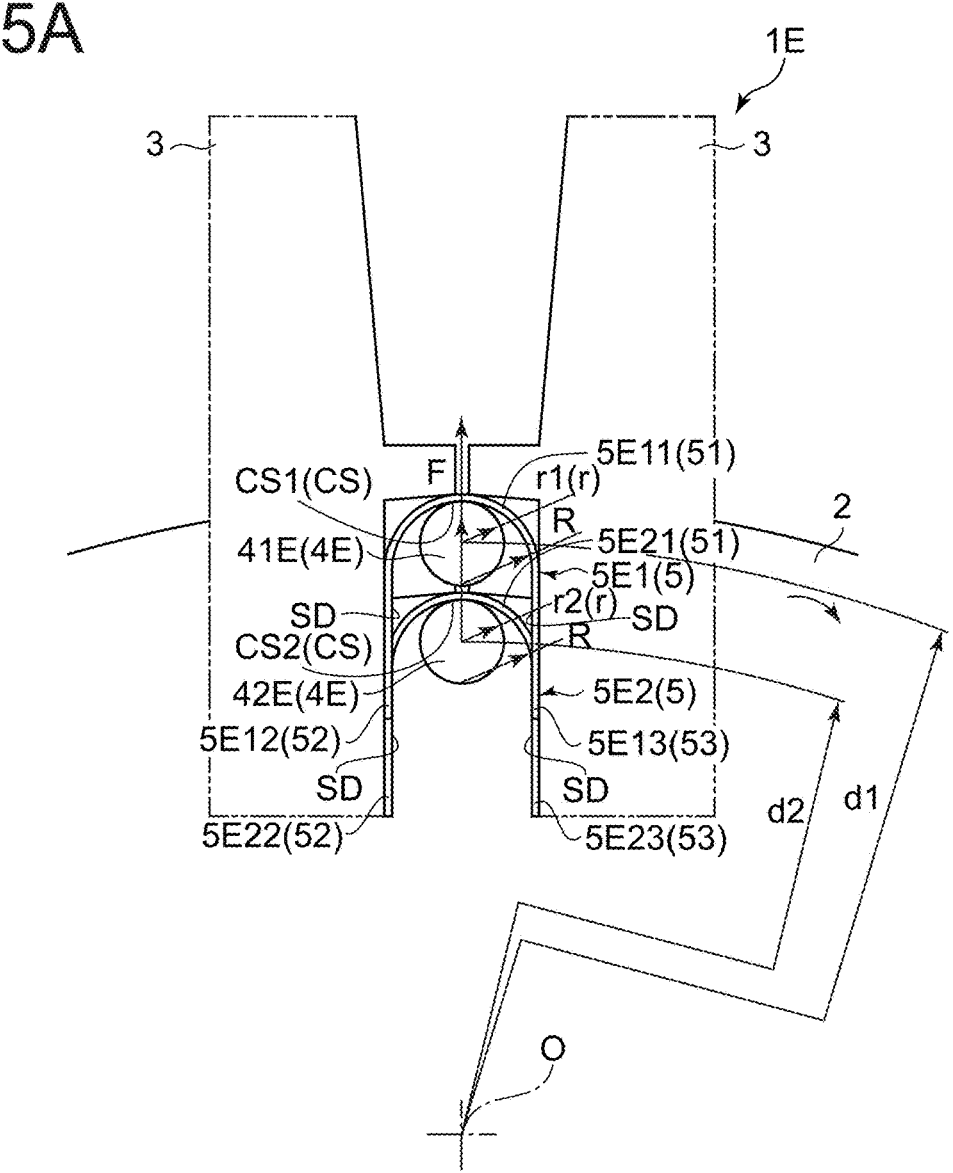
FIG. 5A is a schematic front view of a main portion of a rotor assembly according to an embodiment of the present invention.
Figure 5B:
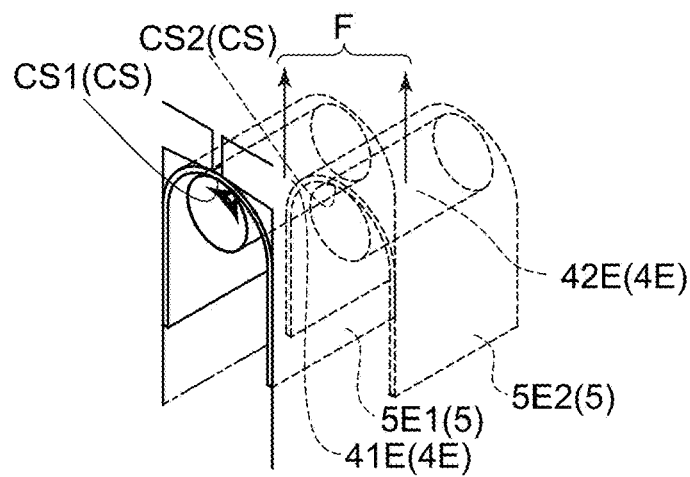
FIG. 5B is a perspective view of a rolling element which rolls on the curved surface shown in FIG. 5A.

For example, in the rotor assembly 1E shown in FIG. 5, the distance d1 from the central axis O of the rotor disc 2 to the first rolling element 41E different from the distance d2 from the central axis O of the rotor disc 2 to the second rolling element 42E.

For example, the distance d1 from the central axis O of the rotor disc 2 to the first rolling element 41E is set such that the constant C1 in the expression fn1=C1×Ω representing the rolling frequency of the first rolling element 41E is 4, and the distance d2 from the central axis O of the rotor disc 2 to the second rolling element 42E is set such that the constant C2 in the expression fn2=C2×Ω representing the rolling frequency of the second rolling element 42E is 2. In this case, when the rotational speed of the rotor assembly 1E is Ω1, the 4N excitation harmonics intersects the natural frequency f11 of the first mode, and when the rotational speed of the rotor assembly 1E is Ω12, the 4N excitation harmonic intersects the natural frequency f12 of the second mode. In addition, when the rotational speed of the rotor assembly 1E is Ω21, the 2N excitation harmonic intersects the natural frequency f21 (f11) of the first mode.

Thus, when the distance d1 from the central axis O of the rotor disc 2 to the first rolling element 41E is set such that C1 is 4 while the distance d2 from the central axis O of the rotor disc 2 to the second rolling element 42E is set such that the constant C2 is 2, fn=f11 at Ω11, fn=f12 at Ω12, and fn=f21 at Ω21, so that the vibration of the rotor blade 3 at the natural frequency corresponding to each rotational speed can be reduced.

Figure 6A:
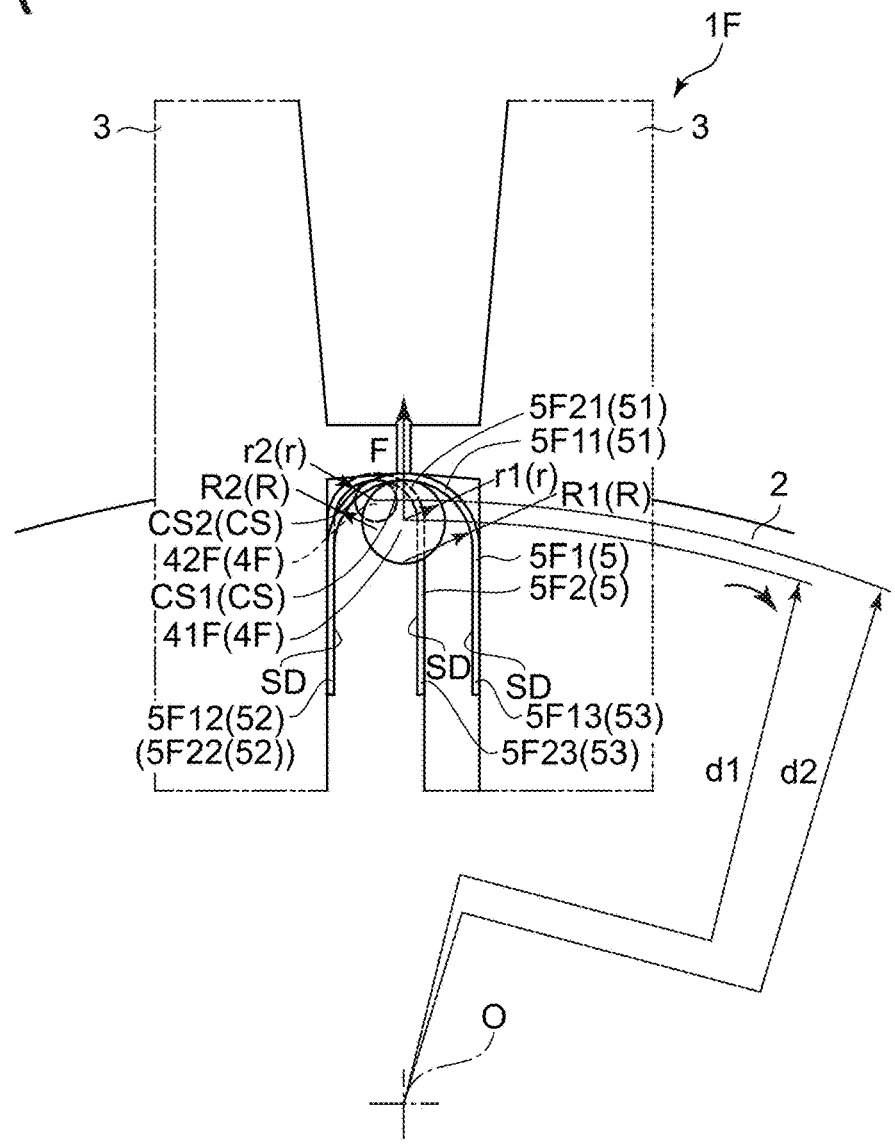
FIG. 6A is a schematic front view of a main portion of a rotor assembly according to an embodiment of the present invention.
Figure 6B:
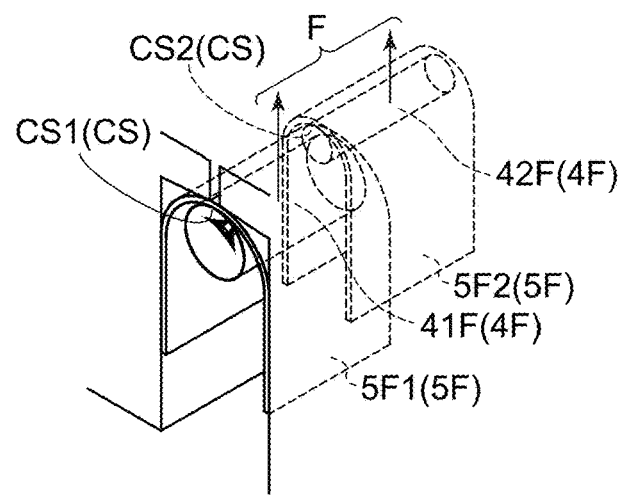
FIG. 6B is a perspective view of a rolling element which rolls on the curved surface shown in FIG. 6A.

For example, in the rotor assembly 1F shown in FIG. 6, two ((A) and (B)) of the following conditions (A) to (C) are satisfied:

(A) the first curvature radius R1 of the first curved surface CS1 is different from the second curvature radius R2 of the second curved surface CS2;

(B) the first radius r1 of the first rolling element 41F is different from the second radius r2 of the second rolling element 42F; or (C) the distance d1 from the central axis O of the rotor disc 2 to the first rolling element 41F is different from the distance d2 from the central axis O of the rotor disc 2 to the second rolling element 42F.

For example, the first curvature radius R1 of the first curved surface CS1 and the first radius r1 of the first rolling element 41F are set such that the constant C1 in the expression fn1=C×Ω representing the rolling frequency of the first rolling element 41F is 4. Further, the second curvature radius R2 of the second curved surface CS2 and the second radius r2 of the second rolling element 42F are set such that the constant C2 in the expression fn2=C2×Ω representing the rolling frequency of the second rolling element 42F is 2. In this case, when the rotational speed of the rotor assembly 1F is 0.11, the 4N excitation harmonic intersects the natural frequency f11 of the first mode, and when the rotational speed of the rotor assembly 1F is Ω12, the 4N excitation harmonic intersects the natural frequency f12 of the second mode. In addition, when the rotational speed of the rotor assembly 1F is Ω21, the 2N excitation harmonic intersects the natural frequency f21 (f11) of the first mode.

Thus, when the first curvature radius R1 of the first curved surface CS1 and the first radius r1 of the first rolling element 41F are set such that the constant C1 in the expression fn1=C1×Ω representing the rolling frequency of the first rolling element 41F is 4 while the second curvature radius R2 of the second curved surface CS2 and the second radius r2 of the second rolling element 42F are set such that the constant C2 in the expression fn2=C2×Ω representing the rolling frequency of the second rolling element 42F is 2, fn=f11 at Q 11, fn=f12 at Ω12, and fn=f21 at Ω21, so that the vibration of the rotor blade 3 at the natural frequency corresponding to each rotational speed can be reduced.

As shown in FIGS. 3 to 6, in the rotor assembly 1C, 1D, 1E, 1F according to some embodiments of the present invention, the first rolling element 41C, 41D, 41E, 41F and the second rolling element 42C, 42D, 42E, 42F are disposed at different positions in the direction along the central axis O of the rotor disc 2.

With the rotor assembly 1C, 1D, 1E, 1F according to the above-described embodiments of the present invention, the integer-multiple orders of excitation harmonics of the first rolling element 41C, 41D, 41E, 41F and the second rolling element 42C, 42D, 42E, 42F are made different, so that the vibration of the rotor blade 3 is damped on the excitation harmonics of different integer-multiple orders. As a result, the rotor assembly 1C, 1D, 1E, 1F can reduce the vibration of the rotor blade 3 at the natural frequency corresponding to the rotational speed of the rotor assembly 1C, 1D, 1E, 1F on the excitation harmonics of different integer-multiple orders.

As shown in FIGS. 1 to 6, in the rotor assembly 1A, 1B, 1C, 1D, 1E, 1F according to some embodiments of the present invention, the rolling element 4A, 4B, 4C, 4D, 4E, 4F is a tubular member or a cylindrical member.

With the rotor assembly 1A, 1B, 1C, 1D, 1E, 1F according to the above-described embodiments of the present invention, as the rotor assembly 1A, 1B, 1C, 1D, 1E, 1F rotates, the centrifugal force F acts on the rolling element 4A, 4B, 4C, 4D, 4E, 4F. Due to the action of the centrifugal force F, the rolling element 4A, 4B, 4C, 4D, 4E, 4F is pressed against the curved surface CS facing inward in the radial direction of the rotor disc 2, and when the rotor blade 3 vibrates, the rolling element 4A, 4B, 4C, 4D, 4E. 4F rolls on the curved surface CS.

Figure 7A:
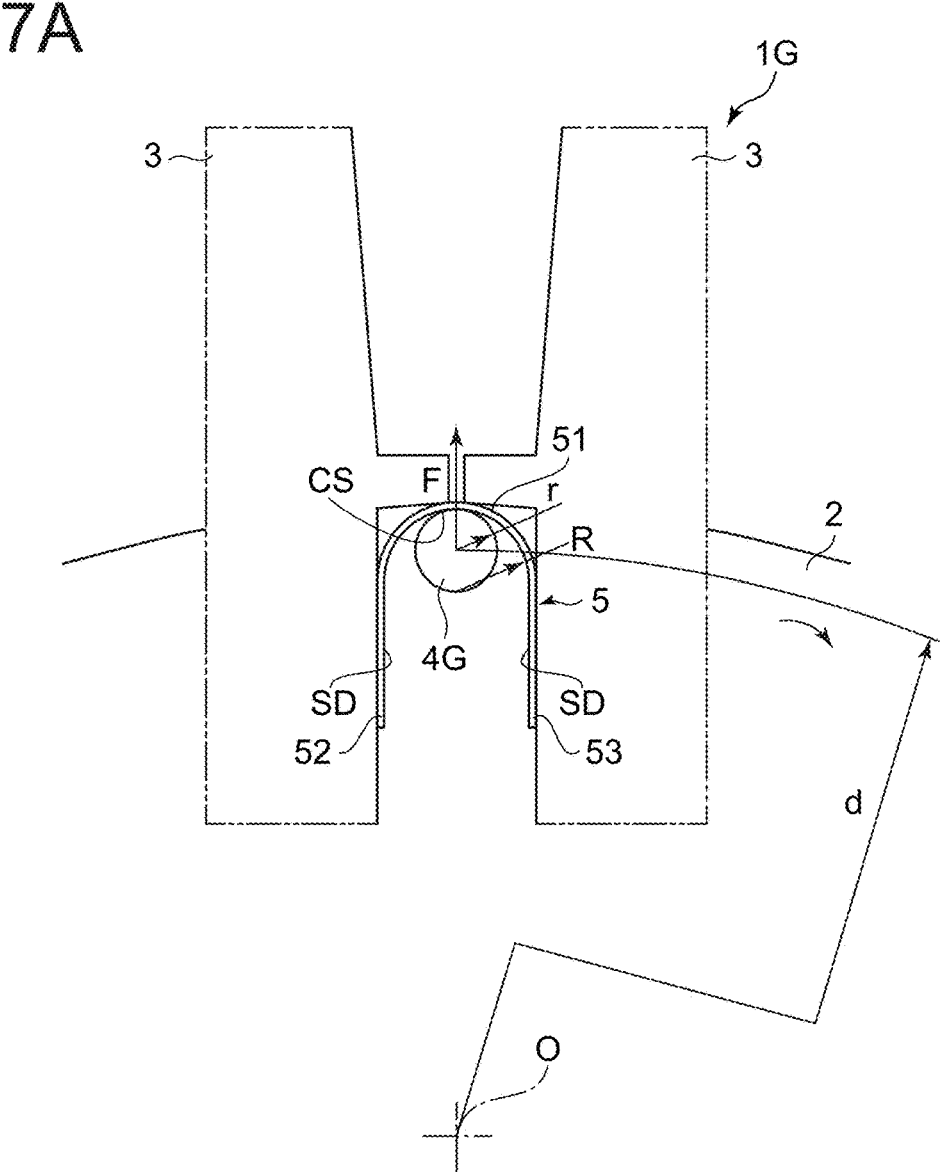
FIG. 7A is a schematic front view of a main portion of a rotor assembly according to an embodiment of the present invention.
Figure 7B:
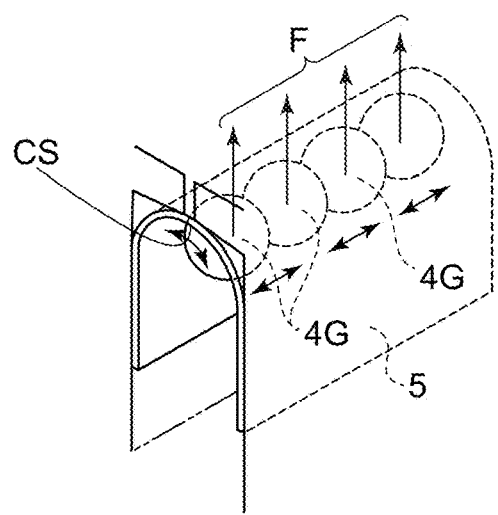
FIG. 7B is a perspective view of a rolling element which rolls on the curved surface shown in FIG. 7A.

As shown in FIG. 7, in the rotor assembly 1G according to some embodiments of the present invention, the rolling element 4G is a plurality of spherical members.

With the rotor assembly 1G according to the above-described embodiments of the present invention, as the rotor assembly 1G rotates, the centrifugal force F acts on the rolling elements 4G. Due to the action of the centrifugal force F, the rolling elements 4G are pressed against the curved surface CS facing inward in the radial direction of the rotor disc 2, and when the rotor blade 3 vibrates, the rolling elements 4G roll on the curved surface CS, and the rolling elements 40 collide with each other. The collision of the rolling elements 4G reduces the vibration of the rotor blade 3.

As shown in FIGS. 2 to 7, in the rotor assembly 1B, 1C, 1D, 1E, 1F, 1G according to some embodiments of the present invention, the curved surface CS is provided on a U-shaped plate spring 5 disposed between the rotor blades 3 which are adjacent in the circumferential direction of the rotor disc 2. The U-shaped plate spring 5 has a U-shaped opening facing inward in the radial direction of the rotor disc 2.

With the rotor assembly 1B, 1C, 1D, 1E, 1F, 1G according to the above-described embodiments, the frictional force acts between the U-shaped plate spring 5 and the rotor blade 3 to damp the vibration occurring in the rotor blade 3. As a result, the rotor assembly 1B, 1C, 1D, 1E, 1F, 1G can reduce the vibration of the rotor blade 3.

Figure 10A:
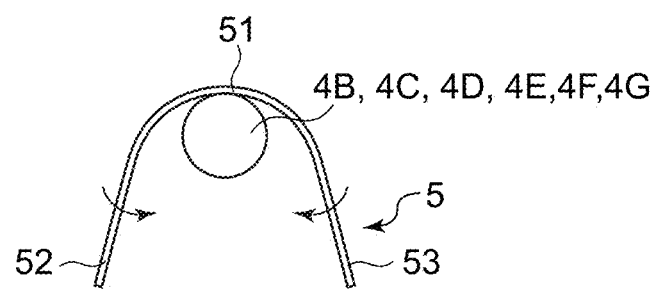
FIG. 10A is a diagram showing the U-shaped plate spring and the rolling element shown in FIGS. 2 to 7 before the U-shaped plate spring is elastically deformed.
Figure 10B:
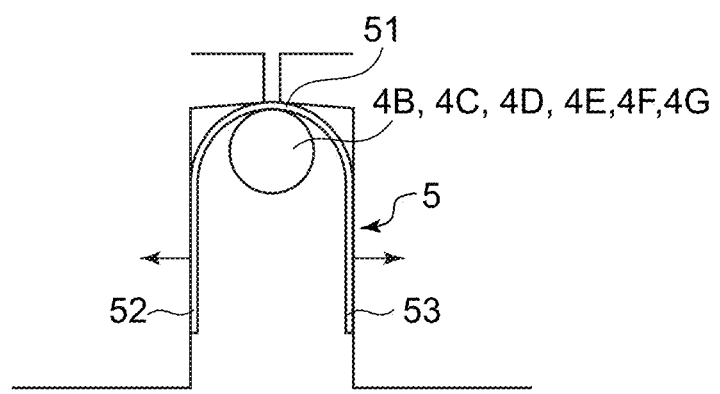
FIG. 10B is a diagram showing the U-shaped plate spring and the rolling element shown in FIGS. 2 to 7 after the U-shaped plate spring is elastically deformed.
Figure 11:
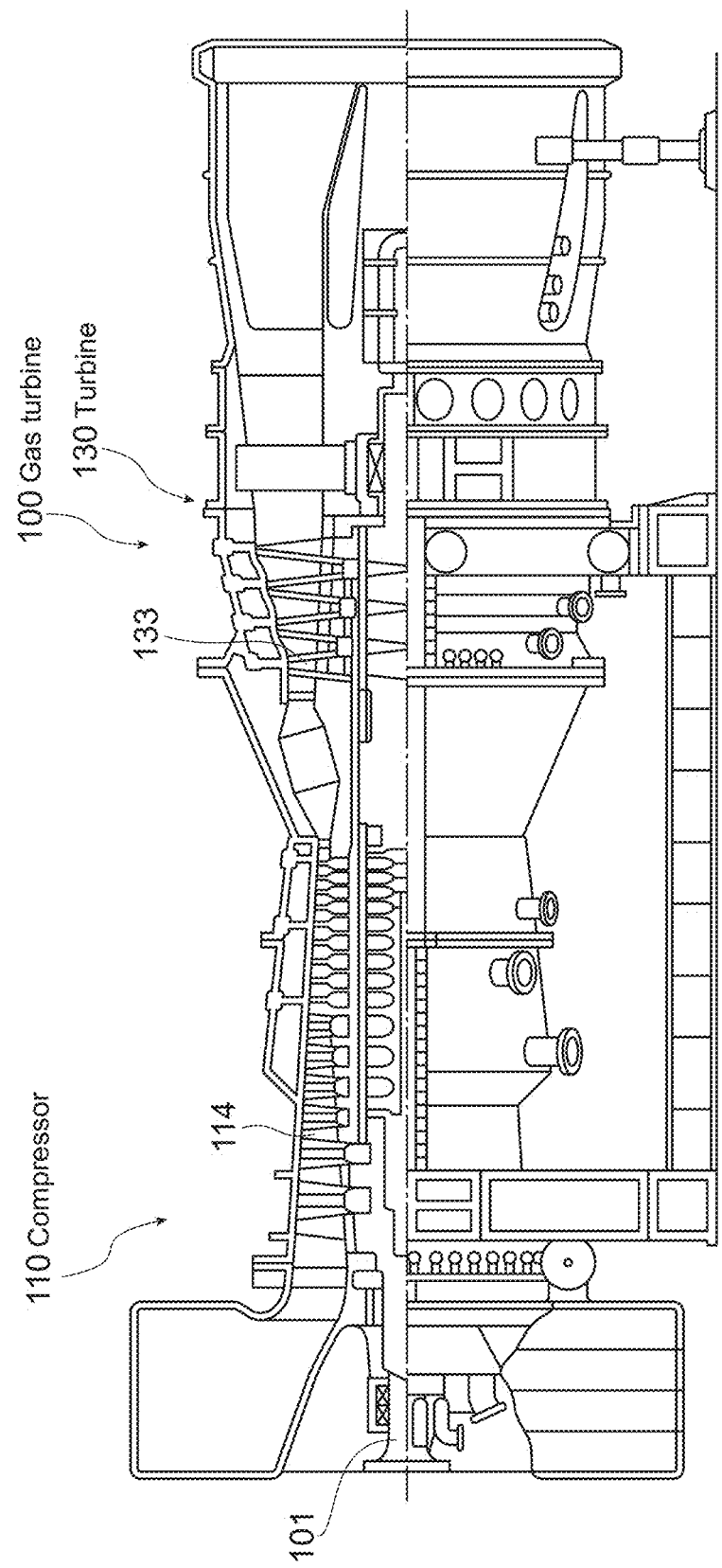
FIG. 11 is a schematic diagram of a rotating machine according to an embodiment of the present invention.

As shown in FIG. 10, in the rotor assembly 1B, 1C, 1D, 1E, 1F, 1G according to some embodiments of the present invention, the U-shaped plate spring 5 has a curved portion 51 whose inner side forms the curved surface CS and leg portions 52, 53 which form side wall surfaces on both sides of the curved surface CS. The leg portions 52, 53 of the U-shaped plate spring 5 extend more than the distance between the rotor blades 3 adjacent in the circumferential direction of the rotor disc 2 (see FIG. 10A), and the U-shaped plate spring 5 is mounted between the rotor blades 3 adjacent in the circumferential direction of the rotor disc 2 in a state where the leg portions 52, 53 are contracted (elastically deformed) (see FIG. 10B).

With the rotor assembly 1B, 1C, 1D, 1E, 1F, 1G according to the above-described embodiments, the elastic restoring force acts on the leg portions 52, 53 of the U-shaped plate spring 5 so as to return to the original shape, and the frictional force acts between each leg portion 52, 53 (outer wall surface) of the U-shaped plate spring 5 and the rotor blade 3 to damp the vibration occurring in the rotor blade 3. As a result, the rotor assembly 1B, 1D, 1D, 1E, 1F, 1G can reduce the vibration of the rotor blade 3.

Figure 1A:
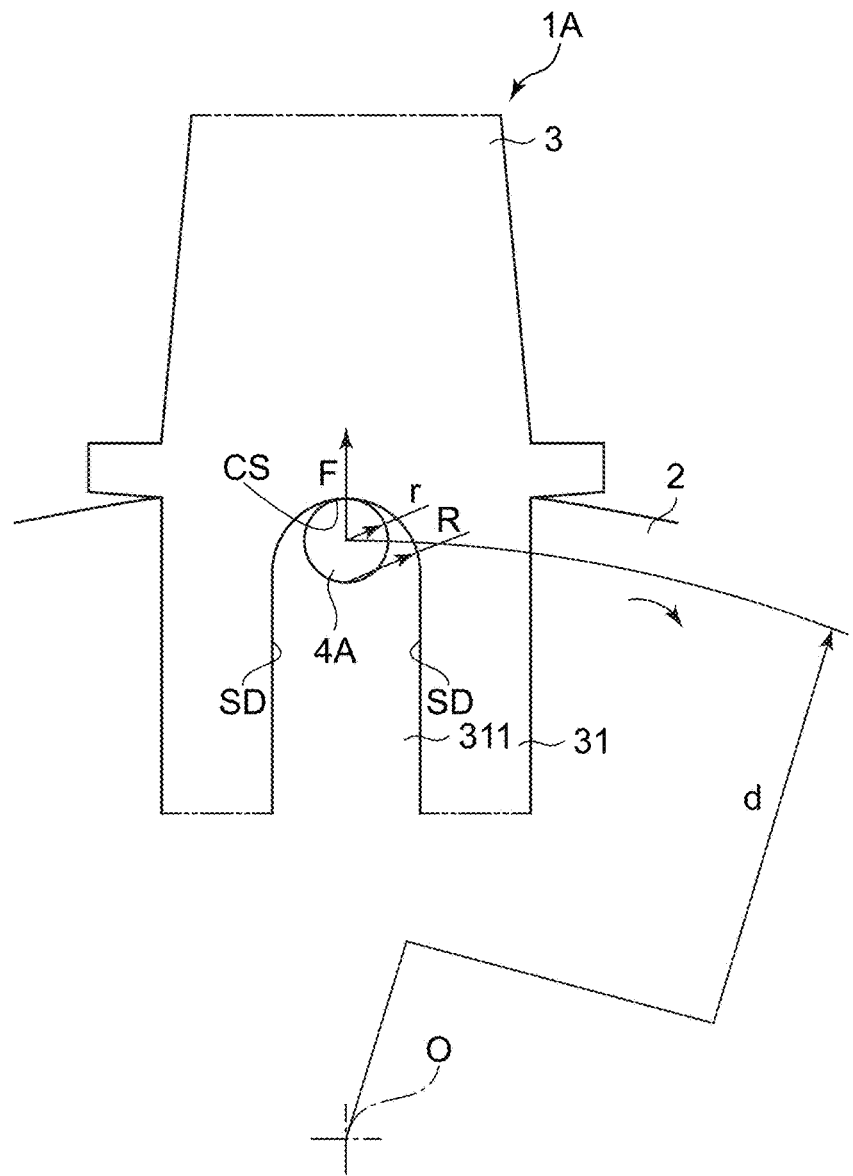
FIG. 1A is a schematic front view of a main portion of a rotor assembly according to an embodiment of the present invention.
Figure 1B:
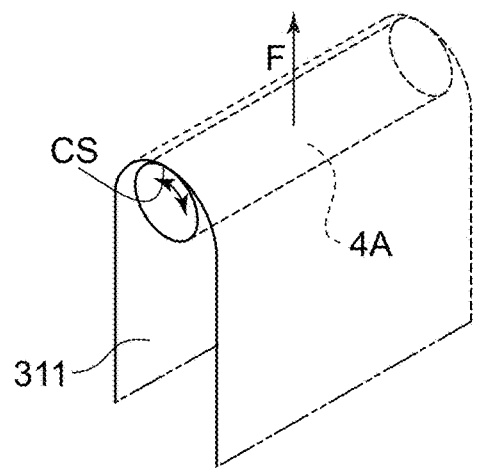
FIG. 1B is a perspective view of a rolling element which rolls on the curved surface shown in FIG. 1A.

As shown in FIG. 1, the rotor assembly 1A according to some embodiments of the present invention includes the rotor disc 2, the plurality of rotor blades 3, and the rolling element 4A. The rotor disc 2 is supported rotatably around the central axis O of the rotor assembly 1A. The rotor blades 3 are fixed to the rotor disc 2 and extend radially outward in the radial direction of the rotor disc 2. The rolling element 4A is configured to roll on the curved surface CS facing inward in the radial direction of the rotor disc 2.

The curved surface CS facing inward in the radial direction of the rotor disc 2 is provided on a fixation portion 31 of the rotor blade 3 to the rotor disc 2. The curved surface CS constitutes a part of a cavity 311 provided in the fixation portion 31 of the rotor blade 3 to the rotor disc 2. The cavity 311 is provided along the radial direction of the rotor disc 2, and the curved surface CS is provided on the side facing inward in the radial direction of the rotor disc 2. The curved surface CS has a constant curvature radius R, and side surfaces SD extending along the radial direction of the rotor disc 2 are provided on both sides of the curved surface CS having the constant curvature radius R. Thus, the pair of side surface SD delimits the curved surface CS to define the curved surface CS.

The rolling element 4A has a circular outer shape in a cross-section perpendicular to the direction along the central axis O of the rotor disc 2, and is a tubular member or a cylindrical member having a radius r smaller than the curvature radius R of the curved surface CS.

With the rotor assembly 1A according to the above-described embodiments of the present invention, as the rotor assembly 1A rotates, the centrifugal force F acts on the rolling elements 4A. Due to the action of the centrifugal force F, the rolling element 4A is pressed against the curved surface CS facing inward in the radial direction of the rotor disc 2, and when the rotor blade 3 vibrates, the rolling element 4A rolls on the curved surface CS. Since the rolling frequency fn of the rolling element 4A is proportional to the rotational speed of the rotor assembly 1A (fn=C×Ω), when the constant C is set to an integer-multiple order of excitation harmonic, the vibration of the rotor blade 3 is damped on the excitation harmonic. As a result, the rotor assembly 1A can reduce the vibration of the rotor blade 3 at the natural frequency corresponding to the rotational speed of the rotor assembly 1A.

Figure 2A:
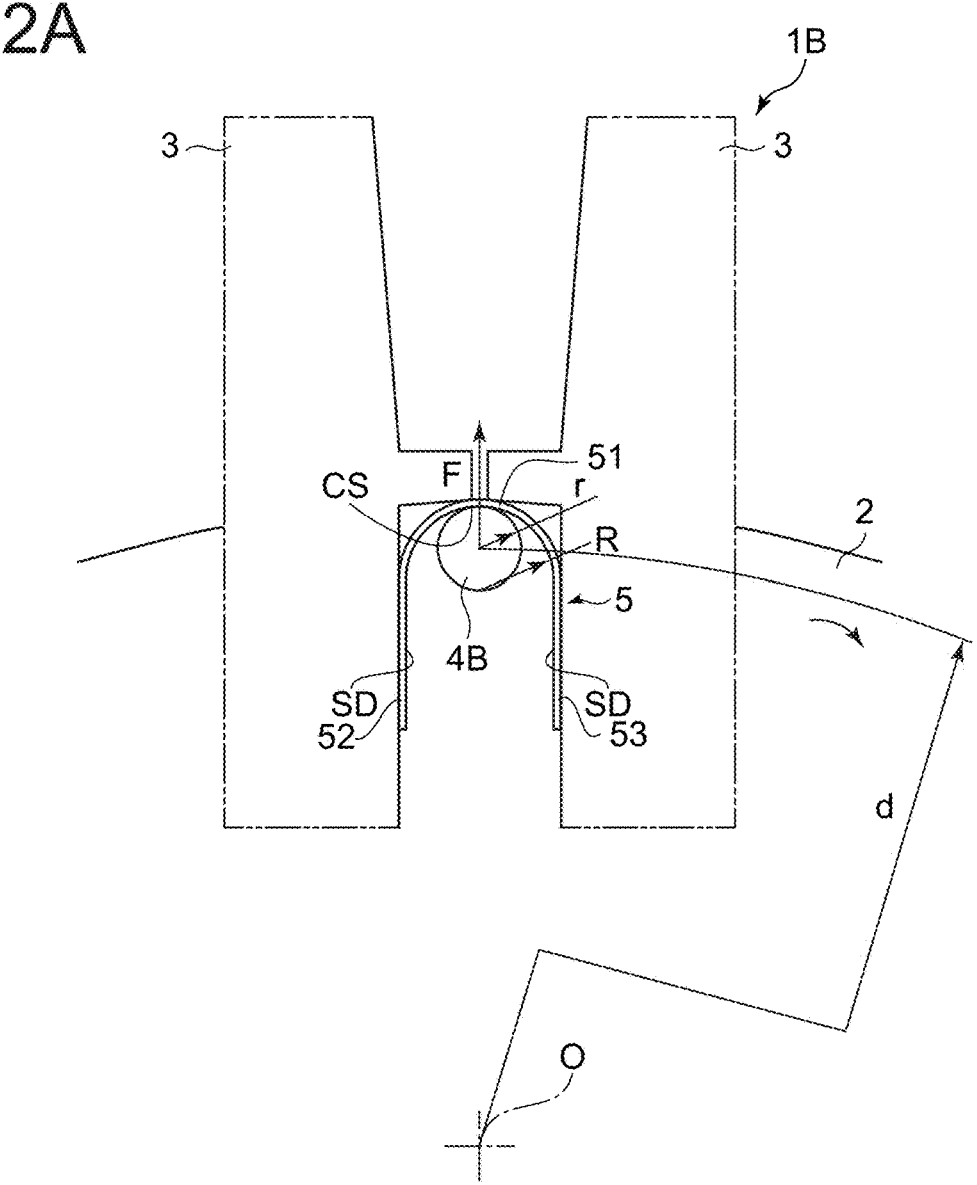
FIG. 2A is a schematic front view of a main portion of a rotor assembly according to an embodiment of the present invention.
Figure 2B:
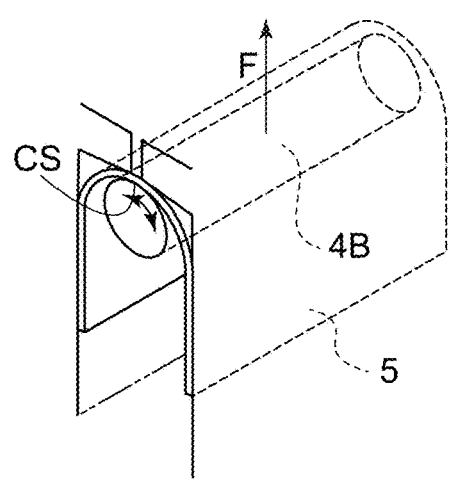
FIG. 2B is a perspective view of a rolling element which rolls on the curved surface shown in FIG. 2A.

As shown in FIG. 2, the rotor assembly 1B according to some embodiments of the present invention includes the rotor disc 2, the plurality of rotor blades 3, and the rolling element 4B. The rotor disc 2 is supported rotatably around the central axis O of the rotor assembly 1B. The rotor blades 3 are fixed to the rotor disc 2 and extend radially outward in the radial direction of the rotor disc 2. The rolling element 4B is configured to roll on the curved surface CS facing inward in the radial direction of the rotor disc 2.

The curved surface CS facing inward in the radial direction of the rotor disc 2 is provided on a U-shaped plate spring 5 mounted between the rotor blades 3 which are adjacent in the circumferential direction of the rotor disc 2. The U-shaped plate spring 5 has a U-shaped opening facing inward in the radial direction of the rotor disc 2. The U-shaped plate spring 5 has a curved portion 51 facing inward in the radial direction of the rotor disc 2 and leg portions 52, 53 having side surfaces SD provided on both sides of the curved surface CS. The leg portions 52, 53 of the U-shaped plate spring 5 extend more than the distance between the rotor blades 3 adjacent in the circumferential direction of the rotor disc 2, and the U-shaped plate spring 5 is mounted between the rotor blades 3 adjacent in the circumferential direction of the rotor disc 2 in a state where the leg portions 52, 53 are contracted (elastically deformed). The curved surface CS of the U-shaped plate spring 5 mounted in this way has a constant curvature radius R (see FIG. 2A).

As shown in FIG. 2, the rolling element 4B has a circular outer shape in a cross-section perpendicular to the direction along the central axis O of the rotor disc 2, and is a tubular member or a cylindrical member having a radius r smaller than the constant curvature radius R of the curved surface CS.

With the rotor assembly 1B according to the above-described embodiments, the elastic restoring force acts on the leg portions 52, 53 of the U-shaped plate spring 5 so as to return to the original shape, and the frictional force acts between each leg portion 52, 53 (outer wall surface) of the U-shaped plate spring 5 and the rotor blade 3 to damp the vibration occurring in the rotor blade 3 (see the dotted line in the order analysis diagram of FIG. 8B). Further, as the rotor assembly 1B rotates, the centrifugal force F acts on the rolling element 4B. Due to the action of the centrifugal force F, the rolling element 4B is pressed against the curved surface CS facing inward in the radial direction of the rotor disc 2, and when the rotor blade 3 vibrates, the rolling element 4B rolls on the curved surface CS. Since the rolling frequency fn of the rolling element 4B is proportional to the rotational speed of the rotor assembly 1B (fn=C×Ω), when the constant C is set to an integer-multiple order of excitation harmonic, the vibration of the rotor blade 3 is damped on the excitation harmonic (see the dotted line in the order analysis diagram of FIG. 8B). As a result, the vibration of the rotor blade 3 is synergistically damped, so that a larger damping effect can be obtained.

As shown in FIG. 3, the rotor assembly 1C according to some embodiments of the present invention includes the rotor disc 2, the plurality of rotor blades 3, and at least one rolling element 4C. The rotor disc 2 is supported rotatably around the central axis O of the rotor assembly 1C. The rotor blades 3 are fixed to the rotor disc 2 and extend radially outward in the radial direction of the rotor disc 2. The at least one rolling element 4C is configured to roll on the curved surface CS facing inward in the radial direction of the rotor disc 2.

The curved surface CS facing inward in the radial direction of the rotor disc 2 is provided on a U-shaped plate spring 5 mounted between the rotor blades 3 which are adjacent in the circumferential direction of the rotor disc 2. The U-shaped plate spring 5 has a U-shaped opening facing inward in the radial direction of the rotor disc 2. The U-shaped plate spring 5 includes a first U-shaped plate spring 5C1 and a second U-shaped plate spring 5C2. The first U-shaped plate spring 5C1 has a first curved surface CS1 as the curved surface CS, and the second U-shaped plate spring 5C2 has a second curved surface CS2 as the curved surface CS.

The first U-shaped plate spring 5C1 has a curved portion 5C11 having a U-shaped opening facing inward in the radial direction of the rotor disc 2 and leg portions 5C12, 5C13 having side surfaces SD provided on both sides of the first curved surface CS1. The leg portions 5C12, 5C13 of the first U-shaped plate spring 5C1 extend more than the distance between the rotor blades 3 adjacent in the circumferential direction of the rotor disc 2, and the first U-shaped plate spring 5C1 is mounted between the rotor blades 3 adjacent in the circumferential direction of the rotor disc 2 in a state where the leg portions 5C12, 5C13 are contracted (elastically deformed). The first curved surface CS1 of the first U-shaped plate spring 5C1 mounted in this way has a constant curvature radius R1.

As with the first U-shaped plate spring 5C1, the second U-shaped plate spring 5C2 has a curved portion 5C21 having a U-shaped opening facing inward in the radial direction of the rotor disc 2 and leg portions 5C22, 5C23 having side surfaces SD provided on both sides of the second curved surface CS2. The leg portions 5C22, 5C23 of the second U-shaped plate spring 5C2 extend more than the distance between the rotor blades 3 adjacent in the circumferential direction of the rotor disc 2, and the second U-shaped plate spring 5C2 is mounted between the rotor blades 3 adjacent in the circumferential direction of the rotor disc 2 in a state where the leg portions 5C22, 5C23 are contracted (elastically deformed). The second curved surface CS2 of the second U-shaped plate spring 5C2 mounted in this way has a constant curvature radius R2.

The first curvature radius R1 of the first curved surface CS1 of the first U-shaped plate spring 5C1 is different from the second curvature radius R2 of the second curved surface CS2 of the second U-shaped plate spring 5C2. The first U-shaped plate spring 5C1 and the second U-shaped plate spring 5C2 are disposed at different positions in the direction along the central axis O of the rotor disc 2.

The rolling element 4C has a circular outer shape in a cross-section perpendicular to the direction along the central axis O of the rotor disc 2, and is a tubular member or a cylindrical member having a radius r smaller than the constant curvature radius R of the curved surface CS. The rolling element 4C includes a first rolling element 41C and a second rolling element 42C. The radius r of the first rolling element 41C is equal to the radius r of the second rolling element 42C, and the first rolling element 41C and the second rolling element 42C are disposed at different positions in the direction along the central axis O of the rotor disc 2.

For example, the first curvature radius R1 of the first curved surface CS1 is set such that the constant C1 in the expression $fn1=C1\times\Omega$ representing the rolling frequency of the first rolling element 41C is 4, and the second curvature radius R2 of the second curved surface CS2 is set such that the constant C2 in the expression $fn2=C2\times\Omega$ representing the rolling frequency of the second rolling element 42C is 2. In this case, as shown in FIG. 9, when the rotational speed of the rotor assembly 1C is f11, the 4N excitation harmonic intersects the natural frequency f11 of the first mode, and when the rotational speed of the rotor assembly 1C is $\Omega12$, the 4N excitation harmonic intersects the natural frequency f12 of the second mode. In addition, when the rotational speed of the rotor assembly 1C is $\Omega21$, the 2N excitation harmonic intersects the natural frequency f21 (f11) of the first mode.

Thus, when the first curvature radius R1 of the first curved surface CS1 is set such that the constant C1 is 4 while the second curvature radius R2 of the second curved surface CS2 is set such that the constant C2 is 2, fn=f11 at $\Omega11$, fn=f12 at $\Omega12$, and fn=f21 at $\Omega21$, so that the vibration of the rotor blade 3 at the natural frequency corresponding to each rotational speed can be reduced.

With the rotor assembly 1C according to the above-described embodiments, the elastic restoring force acts on the leg portions 5C12, 5C13 of the first U-shaped plate spring 5C1 and the leg portions 5C22, 5C23 of the second U-shaped plate spring 5C2 so as to return to the original shape. Thus, the frictional force acts between each leg portion 5C12, 5C13 (outer wall surface) of the first U-shaped plate spring 5C1 and the rotor blade 3, as well as between each leg portion 5C22, 5C23 (outer wall surface) of the second U-shaped plate spring 5C2 and the rotor blade 3, to damp the vibration occurring in the rotor blade 3.

Further, as the rotor assembly 1C rotates, the centrifugal force F acts on the first rolling element 41C and the second rolling element 42C. Due to the action of the centrifugal force F, the first rolling element 41C is pressed against the first curved surface CS1, and the second rolling element 42C is pressed against the second curved surface CS2. Thus, when the rotor blade 3 vibrates, the first rolling element 41C rolls on the first curved surface CS1, and the second rolling element 42C rolls on the second curved surface CS2. Since the rolling frequency fn of the first rolling element 41C and the rolling frequency fn of the second rolling element 42C are proportional to the rotational speed of the rotor assembly 1C (fn=C×$\Omega$), when the constant C is set to an integer-multiple order of excitation harmonic, the vibration of the rotor blade 3 is damped on the excitation harmonic. As a result, the vibration of the rotor blade 3 is synergistically damped, so that a larger damping effect can be obtained.

Further, the integer-multiple orders of excitation harmonics of the first rolling element 41C and the second rolling element 42C can be made different by the curvature radius R1 of the first curved surface CS1 and the curvature radius R2 of the second curved surface CS2. Thus, since the integer-multiple orders of excitation harmonics are different, the vibration of the rotor blade 3 is damped on the excitation harmonics of different integer-multiple orders. As a result, the rotor assembly 1C can reduce the vibration of the rotor blade 3 at the natural frequency corresponding to the rotational speed of the rotor assembly 1C on the excitation harmonics of different integer-multiple orders.

As shown in FIG. 4, the rotor assembly 1D according to some embodiments of the present invention includes the rotor disc 2, the plurality of rotor blades 3, and at least one rolling element 4D. The rotor disc 2 is supported rotatably around the central axis O of the rotor assembly 1D. The rotor blades 3 are fixed to the rotor disc 2 and extend radially outward in the radial direction of the rotor disc 2. The at least one rolling element 4D is configured to roll on the curved surface CS facing inward in the radial direction of the rotor disc 2.

The curved surface CS facing inward in the radial direction of the rotor disc 2 is provided on a U-shaped plate spring 5 mounted between the rotor blades 3 which are adjacent in the circumferential direction of the rotor disc 2. The U-shaped plate spring 5 has a U-shaped opening facing inward in the radial direction of the rotor disc 2. The U-shaped plate spring 5 has a curved portion 51 facing inward in the radial direction of the rotor disc 2 and leg portions 52, 53 having side surfaces SD provided on both sides of the curved surface CS. The leg portions 52, 53 of the U-shaped plate spring 5 extend more than the distance between the rotor blades 3 adjacent in the circumferential direction of the rotor disc 2, and the U-shaped plate spring 5 is mounted between the rotor blades 3 adjacent in the circumferential direction of the rotor disc 2 in a state where the leg portions 52, 53 are contracted (elastically deformed). The curved surface CS of the U-shaped plate spring 5 mounted in this way has a constant curvature radius R.

The rolling element 4D has a circular outer shape in a cross-section perpendicular to the direction along the central axis O of the rotor disc 2, and is a tubular member or a cylindrical member having a radius r smaller than the constant curvature radius R of the curved surface CS. The rolling element 4D includes a first rolling element 41D and a second rolling element 42D. The first radius r1 of the first rolling element 41D is different from the second radius r2 of the second rolling element 42D. The first rolling element 41D and the second rolling element 42D are disposed at different positions in the direction along the central axis O of the rotor disc 2.

For example, the first radius r1 of the first rolling element 41D is set such that the constant C1 in the expression $fn1=C1 \times \Omega$ representing the rolling frequency of the first rolling element 41D is 4, and the second radius r2 of the second rolling element 42D is set such that the constant C2 in the expression $fn=C2 \times \Omega$ representing the rolling frequency of the second rolling element 42D is 2. In this case, as shown in FIG. 9, when the rotational speed of the rotor assembly 1D is $\Omega 11$, the 4N excitation harmonic intersects the natural frequency f11 of the first mode, and when the rotational speed of the rotor assembly 1D is $\Omega 12$, the 4N excitation harmonic intersects the natural frequency f12 of the second mode. In addition, when the rotational speed of the rotor assembly 1D is $\Omega 21$, the 2N excitation harmonic intersects the natural frequency 121 (f11) of the first mode.

Thus, when the first radius r1 of the first rolling element 41D is set such that the constant C1 in the expression $fn1=C1 \times \Omega$ representing the rolling frequency of the first rolling element 41D is 4 while the second radius r2 of the second rolling element 42D is set such that the constant C2 in the expression $fn2=C2 \times \Omega$ representing the rolling frequency of the second rolling element 42D is 2, fn=f11 at $\Omega 11$, fn=f12 at $\Omega 12$, and fn=f21 at $\Omega 21$, so that the vibration of the rotor blade 3 at the natural frequency corresponding to each rotational speed can be reduced.

With the rotor assembly 1D according to the above-described embodiments, the elastic restoring force acts on the leg portions 52, 53 of the U-shaped plate spring 5 so as to return to the original shape, and the frictional force acts between each leg portion 52, 53 (outer side surface) of the U-shaped plate spring 5 and the rotor blade 3 to damp the vibration occurring in the rotor blade 3. Further, as the rotor assembly 1D rotates, the centrifugal force F acts on the first rolling element 41D and the second rolling element 42D. Due to the action of the centrifugal force F, the first rolling element 41D and the second rolling element 42D are pressed against the curved surface CS facing inward in the radial direction of the rotor disc 2, and when the rotor blade 3 vibrates, the first rolling element 41D and the second rolling element 42D roll on the curved surface CS. Since the rolling frequencies fn of the first rolling element 41D and the second rolling element 42D are proportional to the rotational speed of the rotor assembly 1D ($fn=C \times \Omega$), when the constant C is set to an integer-multiple order of excitation harmonic, the vibration of the rotor blade 3 is damped on the excitation harmonic. As a result, the vibration of the rotor blade 3 is synergistically damped, so that a larger damping effect can be obtained.

Further, the integer-multiple orders of excitation harmonics of the first rolling element 41D and the second rolling element 42D can be made different by the first radius r1 of the first rolling element 41D and the second radius r2 of the second rolling element 42D. Thus, since the integer-multiple orders of excitation harmonics are different, the vibration of the rotor blade 3 is damped on the excitation harmonics of different integer-multiple orders. As a result, the rotor assembly 1D can reduce the vibration of the rotor blade 3 at the natural frequency corresponding to the rotational speed of the rotor assembly 1D on the excitation harmonics of different integer-multiple orders.

As shown in FIG. 5, the rotor assembly 1E according to some embodiments of the present invention includes the rotor disc 2, the plurality of rotor blades 3, and at least one rolling element 4E. The rotor disc 2 is supported rotatably around the central axis O of the rotor assembly 1E. The rotor blades 3 are fixed to the rotor disc 2 and extend radially outward in the radial direction of the rotor disc 2. The at least one rolling element 4E is configured to roll on the curved surface CS facing inward in the radial direction of the rotor disc 2.

The curved surface CS facing inward in the radial direction of the rotor disc 2 is provided on a U-shaped plate spring 5 mounted between adjacent rotor blades 3 of the rotor disc 2. The U-shaped plate spring 5 has a U-shaped opening facing inward in the radial direction of the rotor disc 2. The U-shaped plate spring 5 includes a first U-shaped plate spring 5E1 and a second U-shaped plate spring 5E2. The first U-shaped plate spring 5E1 has a first curved surface CS1 as the curved surface CS, and the second U-shaped plate spring 5E2 has a second curved surface CS2 as the curved surface CS.

The first U-shaped plate spring 5E1 has a curved portion 5E11 having a U-shaped opening facing inward in the radial direction of the rotor disc 2 and leg portions 5E12, 5E13 having side surfaces SD provided on both sides of the first curved surface CS1. The leg portions 5E12, 5E13 of the first U-shaped plate spring 5E1 extend more than the distance between the rotor blades 3 adjacent in the circumferential direction of the rotor disc 2, and the first U-shaped plate spring 5E1 is mounted between the rotor blades 3 adjacent in the circumferential direction of the rotor disc 2 in a state where the leg portions 5E12, 5E13 are contracted (elastically deformed). The first curved surface CS1 of the first U-shaped plate spring 5E1 mounted in this way has a constant curvature radius R.

As with the first U-shaped plate spring 5E1, the second U-shaped plate spring 5E2 has a curved portion 5E21 having a U-shaped opening facing inward in the radial direction of the rotor disc 2 and leg portions 5E22, 5E23 having side surfaces SD provided on both sides of the second curved surface CS2. The leg portions 5E22, 5E23 of the second U-shaped plate spring 5E2 extend more than the distance between the rotor blades 3 adjacent in the circumferential direction of the rotor disc 2, and the second U-shaped plate spring 5E2 is mounted between the rotor blades 3 adjacent in the circumferential direction of the rotor disc 2 in a state where the leg portions 5E22, 5E23 are contracted (elastically deformed). The second curved surface CS2 of the second U-shaped plate spring 5E2 mounted in this way has a constant curvature radius R.

The first curvature radius R1 of the first curved surface CS1 of the first U-shaped plate spring 5E1 is equal to the second curvature radius R2 of the second curved surface CS2 of the second U-shaped plate spring 5E2, but the first U-shaped plate spring 5E1 and the second U-shaped plate spring 5E2 are disposed at different positions in the direction along the central axis O of the rotor disc 2.

For arranging the first U-shaped plate spring 5E1 and the second U-shaped plate spring 5E2, for instance, stepped portions with different radii in the radial direction of the rotor disc 2 may be arranged in the direction along the central axis O of the rotor disc 2.

The rolling element 4E has a circular outer shape in a cross-section perpendicular to the direction along the central axis O of the rotor disc 2, and is a tubular member or a cylindrical member having a radius r smaller than the constant curvature radius R of the curved surface CS. The rolling element 4E includes a first rolling element 41E and a second rolling element 42E. The first radius r1 of the first rolling element 41E is equal to the second radius r2 of the second rolling element 42E, but the first rolling element 41E and the second rolling element 42E are disposed at different position in the direction along the central axis O of the rotor disc 2.

For example, the distance d1 from the central axis O of the rotor disc 2 to the first curved surface CS1 is set such that the constant C1 in the expression $fn1=C1\times\Omega$ representing the rolling frequency of the first rolling element 41E is 4, and the distance d2 from the central axis O of the rotor disc 2 to the second curved surface CS2 is set such that the constant C2 in the expression $fn2=C2\times\Omega$ representing the rolling frequency of the second rolling element 42E is 2. In this case, when the rotational speed of the rotor assembly 1E is $\Omega11$, the 4N excitation harmonic intersects the natural frequency f11 of the first mode, and when the rotational speed of the rotor assembly 1E is $\Omega12$, the 4N excitation harmonic intersects the natural frequency f12 of the second mode. In addition, when the rotational speed of the rotor assembly 1E is $\Omega21$, the 2N excitation harmonic intersects the natural frequency f21 (f11) of the first mode.

Thus, when the distance d1 from the central axis O of the rotor disc 2 to the first curved surface CS1 is set such that C1 is 4 while the distance d2 from the central axis O of the rotor disc 2 to the second curved surface CS2 is set such that the constant C2 in the expression $fn2=C2\times\Omega$ representing the rolling frequency of the second rolling element 42E is 2, fn=f11 at $\Omega11$, fn=f12 at $\Omega12$, and fn=f21 at $\Omega21$, so that the vibration of the rotor blade 3 at the natural frequency corresponding to each rotational speed can be reduced.

With the rotor assembly 1E according to the above-described embodiments, the elastic restoring force acts on the leg portions 5E12, 5E13 of the first U-shaped plate spring 5E1 and the leg portions 5E22, 5E23 of the second U-shaped plate spring 5E2 so as to return to the original shape. Thus, the frictional force acts between each leg portion 5E12, 5E13 (outer wall surface) of the first U-shaped plate spring 5E1 and the rotor blade 3, as well as between each leg portion 5E22, 5E23 (outer wall surface) of the second U-shaped plate spring 5E2 and the rotor blade 3, to damp the vibration occurring in the rotor blade 3.

Further, as the rotor assembly 1E rotates, the centrifugal force F acts on the first rolling element 41E and the second rolling element 42E. Due to the action of the centrifugal force F, the first rolling element 41E is pressed against the first curved surface CS1, and the second rolling element 42E is pressed against the second curved surface CS2. Thus, when the rotor blade 3 vibrates, the first rolling element 41E rolls on the first curved surface CS1, and the second rolling element 42E rolls on the second curved surface CS2. Since the rolling frequency fn of the first rolling element 41E and the rolling frequency fn of the second rolling element 42E are proportional to the rotational speed of the rotor assembly 1E ($fn=C\times\Omega$), when the constant C is set to an integer-multiple order of excitation harmonic, the vibration of the rotor blade 3 is damped on the excitation harmonic. As a result, the vibration of the rotor blade 3 is synergistically damped, so that a larger damping effect can be obtained.

Further, the integer-multiple orders of excitation harmonics of the first rolling element 41E and the second rolling element 42E can be made different by the distance d1 from the central axis O of the rotor disc 2 to the first rolling element 41E and the distance d2 from the central axis O of the rotor disc 2 to the second rolling element 42E. Thus, since the integer-multiple orders of excitation harmonics are different, the vibration of the rotor blade 3 is damped on the excitation harmonics of different integer-multiple orders. As a result, the rotor assembly 1E can reduce the vibration of the rotor blade 3 at the natural frequency corresponding to the rotational speed of the rotor assembly 1E on the excitation harmonics of different integer-multiple orders.

As shown in FIG. 6, the rotor assembly 1F according to some embodiments of the present invention includes the rotor disc 2, the plurality of rotor blades 3, and at least one rolling element 4F. The rotor disc 2 is supported rotatably around the central axis O of the rotor assembly 1F. The rotor blades 3 are fixed to the rotor disc 2 and extend radially outward in the radial direction of the rotor disc 2. The at least one rolling element 4F is configured to roll on the curved surface CS facing inward in the radial direction of the rotor disc 2.

The curved surface CS facing inward in the radial direction of the rotor disc 2 is provided on a U-shaped plate spring 5 mounted between adjacent rotor blades 3 of the rotor disc 2. The U-shaped plate spring 5 has a U-shaped opening facing inward in the radial direction of the rotor disc 2. The U-shaped plate spring 5 includes a first U-shaped plate spring 5F1 and a second U-shaped plate spring 5F2. The first U-shaped plate spring 5F1 has a first curved surface CS1 as the curved surface CS, and the second U-shaped plate spring 5F2 has a second curved surface CS2 as the curved surface CS.

The first U-shaped plate spring 5F1 has a curved portion 5F11 having a U-shaped opening facing inward in the radial direction of the rotor disc 2 and leg portions 5F12, 5F13 having side surfaces SD provided on both sides of the first curved surface CS1. The leg portions 5F12, 5F13 of the first U-shaped plate spring 5F1 extend more than the distance between the rotor blades 3 adjacent in the circumferential direction of the rotor disc 2, and the first U-shaped plate spring 5F1 is mounted between the rotor blades 3 adjacent in the circumferential direction of the rotor disc 2 in a state where the leg portions 5F12, 5F13 are contracted (elastically deformed). The first curved surface CS1 of the first U-shaped plate spring 5F1 mounted in this way has a constant curvature radius R1.

As with the first U-shaped plate spring 5F1, the second U-shaped plate spring 5F2 has a curved portion 5F21 having a U-shaped opening facing inward in the radial direction of the rotor disc 2 and leg portions 5F22, 5F23 having side surfaces SD provided on both sides of the second curved surface CS2. The leg portions 5F22, 5F23 of the second U-shaped plate spring 5F2 extend more than the distance between the rotor blades 3 adjacent in the circumferential direction of the rotor disc 2, and the second U-shaped plate spring 5F2 is mounted between the rotor blades 3 adjacent in the circumferential direction of the rotor disc 2 in a state where the leg portions 5F22, 5F23 are contracted (elastically deformed). The second curved surface CS2 of the second U-shaped plate spring 5F2 mounted in this way has a constant curvature radius R2.

The first curvature radius R1 of the first curved surface CS1 of the first U-shaped plate spring 5F1 is different from the second curvature radius R2 of the second curved surface CS2 of the second U-shaped plate spring 5F2. The first U-shaped plate spring 5F1 and the second U-shaped plate spring 5F2 are disposed at different positions in the direction along the central axis O of the rotor disc 2.

For arranging the first U-shaped plate spring 5F1 and the second U-shaped plate spring 5F2, for instance, stepped portions with different widths in the circumferential direction of the rotor disc 2 may be arranged in the direction along the central axis O of the rotor disc 2.

The rolling element 4F has a circular outer shape in a cross-section perpendicular to the direction along the central axis O of the rotor disc 2, and is a tubular member or a cylindrical member having a radius r smaller than the constant curvature radius R of the curved surface CS. The rolling element 4F includes a first rolling element 41F and a second rolling element 42F. The first radius r1 of the first rolling element 41F is different from the second radius r2 of the second rolling element 42F. The first rolling element 41F and the second rolling element 42F are disposed at different positions in the direction along the central axis O of the rotor disc 2.

For example, the first curvature radius R1 of the first curved surface CS1 of the first U-shaped plate spring 5F1 and the first radius r1 of the first rolling element 41F are set such that the constant C1 in the expression $fn1=C1\times\Omega$ representing the rolling frequency of the first rolling element 41F is 4. Further, the second curvature radius R2 of the second curved surface CS2 of the second U-shaped plate spring 5F2 and the second radius r2 of the second rolling element 42F are set such that the constant C1 in the expression $fn2=C2\times\Omega$ representing the rolling frequency of the second rolling element 42F is 2. In this case, when the rotational speed of the rotor assembly 1F is $\Omega11$, the 4N excitation harmonic intersects the natural frequency f11 of the first mode, and when the rotational speed of the rotor assembly 1F is $\Omega12$, the 4N excitation harmonic intersects the natural frequency f12 of the second mode. In addition, when the rotational speed of the rotor assembly 1F is $\Omega21$, the 2N excitation harmonic intersects the natural frequency f21 (f11) of the first mode.

Thus, when the first curvature radius R1 of the first curved surface CS1 of the first U-shaped plate spring 5F1 and the first radius r1 of the first rolling element 41F are set such that the constant C1 in the expression $fn1=C1\times\Omega$ representing the rolling frequency of the first rolling element 41F is 4 while the second curvature radius R2 of the second curved surface CS2 of the second U-shaped plate spring 5F2 and the second radius r2 of the second rolling element 42F are set such that the constant C1 in the expression $fn2=C2\times\Omega$ representing the rolling frequency of the second rolling element 42F is 2, fn=f11 at $\Omega11$, fn=f12 at $\Omega12$, and fn=f21 at $\Omega21$, so that the vibration of the rotor blade 3 at the natural frequency corresponding to each rotational speed can be reduced.

With the rotor assembly 1F according to the above-described embodiments, the elastic restoring force acts on the leg portions 5F12, 5F13 of the first U-shaped plate spring 5F1 and the leg portions 5F22, 5F23 of the second U-shaped plate spring 5F2 so as to return to the original shape. Thus, the frictional force acts between each leg portion 5F12, 5F13 (outer wall surface) of the first U-shaped plate spring 5F1 and the rotor blade 3, as well as between each leg portion 5F22, 5F23 (outer wall surface) of the second U-shaped plate spring 5F2 and the rotor blade 3, to damp the vibration occurring in the rotor blade 3.

Further, as the rotor assembly 1F rotates, the centrifugal force F acts on the first rolling element 41F and the second rolling element 42F. Due to the action of the centrifugal force F, the first rolling element 41F is pressed against the first curved surface CS1, and the second rolling element 42F is pressed against the second curved surface CS2. Thus, when the rotor blade 3 vibrates, the first rolling element 41F rolls on the first curved surface CS1, and the second rolling element 42F rolls on the second curved surface CS2. Since the rolling frequency fn of the first rolling element 41F and the rolling frequency fn of the second rolling element 42F are proportional to the rotational speed of the rotor assembly 1F ($fn=C\times\Omega$), when the constant C is set to an integer-multiple order of excitation harmonic, the vibration of the rotor blade 3 is damped on the excitation harmonic. As a result, the vibration of the rotor blade 3 is synergistically damped, so that a larger damping effect can be obtained.

Further, the integer-multiple orders of excitation harmonics of the first rolling element 41F and the second rolling element 42F can be made different by, on one hand, the curvature radius sR1 of the first curved surface CS1 and the first radius r1 of the first rolling element 41F and, on the other hand, the curvature radius R2 of the second curved surface CS2 and the second radius r2 of the second rolling element 42F. Thus, since the integer-multiple orders of excitation harmonics are different, the vibration of the rotor blade 3 is damped on the excitation harmonics of different integer-multiple orders. As a result, the rotor assembly 1F can reduce the vibration of the rotor blade 3 at the natural frequency corresponding to the rotational speed of the rotor assembly 1F on the excitation harmonics of different integer-multiple orders.

As shown in FIG. 7, the rotor assembly 1G according to some embodiments of the present invention includes the rotor disc 2, the plurality of rotor blades 3, and at least one rolling element 4G. The rotor disc 2 is supported rotatably around the central axis O of the rotor assembly 1G. The rotor blades 3 are fixed to the rotor disc 2 and extend radially outward in the radial direction of the rotor disc 2. The at least one rolling element 4G is configured to roll on the curved surface CS facing inward in the radial direction of the rotor disc 2.

The curved surface CS facing inward in the radial direction of the rotor disc 2 is provided on a U-shaped plate spring 5 mounted between the rotor blades 3 which are adjacent in the circumferential direction of the rotor disc 2. The U-shaped plate spring 5 has a U-shaped opening facing inward in the radial direction of the rotor disc 2. The U-shaped plate spring 5 has a curved portion 51 facing inward in the radial direction of the rotor disc 2 and leg portions 52, 53 having side surfaces SD provided on both sides of the curved surface CS. The leg portions 52, 53 of the U-shaped plate spring 5 extend more than the distance between the rotor blades 3 adjacent in the circumferential direction of the rotor disc 2, and the U-shaped plate spring 5 is mounted between the rotor blades 3 adjacent in the circumferential direction of the rotor disc 2 in a state where the leg portions 52, 53 are contracted (elastically deformed). The curved surface CS of the U-shaped plate spring 5 mounted in this way has a constant curvature radius R.

The rolling element 4G has a circular outer shape in a cross-section perpendicular to the direction along the central axis O of the rotor disc 2, and is a plurality of spherical members having a radius smaller than the curvature radius R of the curved surface CS.

With the rotor assembly 1G according to the above-described embodiments, the elastic restoring force acts on the leg portions 52, 53 of the U-shaped plate spring 5 so as to return to the original shape, and the frictional force acts between each leg portion 52, 53 of the U-shaped plate spring 5 and the rotor blade 3 to damp the vibration occurring in the rotor blade 3. Further, as the rotor assembly 1G rotates, the centrifugal force F acts on the rolling elements 4G. Due to the action of the centrifugal force F, the rolling elements 4G are pressed against the curved surface CS facing inward in the radial direction of the rotor disc 2, and when the rotor blade 3 vibrates, the rolling elements 40 roll on the curved surface CS. Since the rolling frequency fn of each rolling element 40 is proportional to the rotational speed of the rotor assembly 1G (fn=C×Ω), when the constant C is set to an integer-multiple order of excitation harmonic, the vibration of the rotor blade 3 is damped on the excitation harmonic. As a result, the vibration of the rotor blade 3 is synergistically damped, so that a larger damping effect can be obtained.

Further, the rolling elements 4G collide with each other in the direction along the central axis O of the rotor disc 2. Thus, the rotor assembly 10 can reduce the vibration of the rotor blade 3 by the collision of the rolling elements 4G.

As shown in FIG. 11, the rotating machine according to some embodiments of the present invention includes any one rotor assembly 1A, 1B, 1C, 1D, 1E, 1F, 1G of the rotor assemblies 1A, 1B, 1C, 1D, 1E, 1F, 1G according to the above-described embodiments.

The rotating machine is, for example, an axial flow rotating machinery in which a fluid flows in the direction along the rotational shaft 101, such as a gas turbine (see FIG. 11), a steam turbine, or a jet engine, and includes any one rotor assembly 1A, 1B, 1C, 1D, 1E, 1F, 1G of the rotor assemblies 1A, 1B, 1C, 1D, 1E, 1F, 1G according to the above-described embodiments.

With the rotating machine according to the above-described embodiments, in the rotating machine, as the rotor assembly 1A, 1B, 1C, 1D, 1E, 1F, 1G rotates, the centrifugal force F acts on the rolling element 4A, 4B, 4C, 4D, 4E, 4F, 4G. Due to the action of the centrifugal force F, the rolling element 4A, 4B, 4C, 4D, 4E, 4F, 4G is pressed against the curved surface CS facing inward in the radial direction of the rotor disc 2, and when the rotor blade 3 vibrates, the rolling element 4A, 4B, 4C, 4D, 4E, 4F, 4G rolls on the curved surface CS. Since the rolling frequency fn of the rolling element 4A, 4B, 4C, 4D, 4E, 4F, 4G is proportional to the rotational speed Ω of the rotor assembly 1A, 1B, 1C, 1D, 1E, 1F, 1G (fn=C×Ω), when the constant C is set to an integer-multiple order of excitation harmonic, the vibration of the rotor blade 3 is damped on the excitation harmonic. As a result, the rotating machine can reduce the vibration of the rotor blade 3 at the natural frequency corresponding to the rotational speed of the rotor assembly 1A, 1B, 1C, 1D, 1E, 1F, 1G.

As shown in FIG. 11, the rotating machine according to some embodiments of the present invention is, for example, a gas turbine 100 in which a compressor rotor blade 114 of a compressor 110 or a turbine rotor blade 133 of a turbine 130 is provided with any one rotor assembly 1A, 1B, 1C, 1D, 1E, 1F, 1G of the rotor assemblies 1A, 1B, 1C, 1D, 1E, 1F, 1G according to the above-described embodiments.

With the rotating machine according to the above-described embodiments, as the rotor assembly 1A, 1B, 1C, 1D, 1E, 1F, 1G rotates, the centrifugal force F acts on the rolling element 4A, 4B, 4C, 4D, 4E, 4F, 4G. Due to the action of the centrifugal force F, the rolling element 4A, 4B, 4C, 4D, 4E, 4F, 4G is pressed against the curved surface CS facing inward in the radial direction of the rotor disc 2, and when the rotor blade 3 vibrates, the rolling element 4A, 4B, 4C, 4D, 4F, 4G rolls on the curved surface CS. Since the rolling frequency fn of the rolling element 4A, 4B, 4C, 4D, 4E, 4F, 4G is proportional to the rotational speed Ω of the rotor assembly 1A, 1B, 1C, 1D, 1E, 1F, 1G (fn=C×Ω), when the constant C is set to an integer-multiple order of excitation harmonic, the vibration of the rotor blade 3 is damped on the excitation harmonic. As a result, the rotating machine can reduce the vibration of the rotor blade 3 at the natural frequency corresponding to the rotational speed of the rotor assembly 1A, 1B, 1C, 1D, 1E, 1F, 1G.

The present invention is not limited to the embodiments described above, but includes modifications to the embodiments described above, and embodiments composed of combinations of those embodiments.

REFERENCE SIGNS LIST 1A, 1B, 1C, 1D, 1E, 1F, 1G Rotor assembly
2 Rotor disc
3 Rotor blade
31 Fixation portion
311 Cavity
4A, 4B, 4C, 4D, 4E, 4F, 4G Rolling element
41C, 41D First rolling element
42C, 42D Second rolling element
5 U-shaped plate spring
51 Curved portion
52, 53 Leg portion
5C1, 5E1, 5F1 First U-shaped plate spring
5C11, 5E11, 5F11 Curved portion
5C12, 5E12, 5F12 Leg portion
5C13, 5E13, 5F13 Leg portion
5C2, 5E2, 5F2 Second U-shaped plate spring
5C21, 5E21, 5F21 Curved portion
5C22, 5E22, 5F22 Leg portion
5C23, 5E23, 5F23 Leg portion
100 Gas turbine
101 Rotational shaft
110 Compressor
114 Compressor rotor blade
130 Turbine
133 Turbine rotor blade
O Central axis
CS Curved surface
CS1 First curved surface
CS2 Second curved surface
SD Side surface
F Centrifugal force

The invention claimed is:

1. A rotor assembly, comprising:
   a rotor disc;
   a plurality of rotor blades fixed to the rotor disc and extending radially outward in a radial direction of the rotor disc; and
   at least one rolling element configured to roll on at least one curved surface facing inward in the radial direction of the rotor disc, each curved surface being supported by circumferentially adjacent rotor blades of the plurality of rotor blades,
   wherein the at least one rolling element includes:
      a first rolling element configured to roll on a first curved surface of the at least one curved surface, the first curved surface having a first curvature radius R1; and
      a second rolling element configured to roll on a second curved surface of the at least one curved surface, the second curved surface having a second curvature radius R2; and
   wherein the rotor assembly satisfies at least one of the following conditions (A) and (C):
      (A) the first curvature radius R1 of the first curved surface is different from the second curvature radius R2 of the second curved surface; and
      (C) a distance d1 from a central axis of the rotor disc to the first rolling element is different from a distance d2 from the central axis of the rotor disc to the second rolling element.

2. The rotor assembly according to claim 1, wherein the at least one rolling element has a circular outer shape in a cross-section perpendicular to a direction along the central axis of the rotor disc.

3. The rotor assembly according to claim 2, wherein the at least one rolling element has a radius r smaller than the first curvature radius R1 and the second curvature radius R2.

4. The rotor assembly according to claim 1, wherein the first rolling element and the second rolling element are disposed at different positions in a direction along the central axis of the rotor disc.

5. The rotor assembly according to claim 4, comprising:
   a first U-shaped plate spring having the first curved surface; and
   a second U-shaped plate spring having the second curved surface,
   wherein the first U-shaped plate spring and the second U-shaped plate spring are disposed at different positions in a direction along the central axis of the rotor disc.

6. The rotor assembly according to claim 1, wherein the at least one rolling element is a tubular member or a cylindrical member.

7. The rotor assembly according to claim 1, wherein the at least one rolling element is a plurality of spherical members.

8. A rotating machine, comprising the rotor assembly according to claim 1.

9. A rotor assembly, comprising:
   a rotor disc;
   a plurality of rotor blades fixed to the rotor disc and extending radially outward in a radial direction of the rotor disc; and
   at least one rolling element configured to roll on a curved surface facing inward in the radial direction of the rotor disc,
   wherein the curved surface is provided on a U-shaped plate spring mounted in an elastically deformed state between two of the plurality of rotor blades which are adjacent in a circumferential direction of the rotor disc, and
   wherein the U-shaped plate spring has a U-shaped opening facing inward in the radial direction of the rotor disc.

10. The rotor assembly according to claim 9, wherein the at least one rolling element has a circular outer shape in a cross-section perpendicular to a direction along a central axis of the rotor disc.

11. The rotor assembly according to claim 9, wherein the curved surface has a constant curvature radius R, and
   wherein the at least one rolling element has a radius r smaller than the curvature radius R.

12. The rotor assembly according to claim 9, wherein the at least one rolling element includes:
   a first rolling element configured to roll on a first curved surface portion of the curved surface; and
   a second rolling element configured to roll on a second curved surface portion of the curved surface, and
   wherein the first rolling element and the second rolling element are disposed at different positions in a direction along a central axis of the rotor disc.

13. The rotor assembly according to claim 9, wherein the at least one rolling element is a tubular member or a cylindrical member.

14. The rotor assembly according to claim 9, wherein the at least one rolling element is a plurality of spherical members.

15. A rotating machine, comprising the rotor assembly according to claim 9.

* * * * *